(12) United States Patent
Chattopadhyay

(10) Patent No.: US 9,963,231 B2
(45) Date of Patent: May 8, 2018

(54) SYSTEM AND METHOD FOR DEPLOYMENT OF AN AIRCRAFT WEAPONS SYSTEM

(71) Applicant: THE BOEING COMPANY, Chicago, IL (US)

(72) Inventor: Aditya Brahma Chattopadhyay, Norman, OK (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

(21) Appl. No.: 15/278,730

(22) Filed: Sep. 28, 2016

(65) Prior Publication Data

US 2018/0086463 A1 Mar. 29, 2018

(51) Int. Cl.
| | |
|---|---|
| *F41G 5/00* | (2006.01) |
| *B64D 7/06* | (2006.01) |
| *F41A 23/20* | (2006.01) |
| *F41A 27/06* | (2006.01) |
| *B64C 1/14* | (2006.01) |

(52) U.S. Cl.
CPC ............... *B64D 7/06* (2013.01); *B64C 1/14* (2013.01); *F41A 23/20* (2013.01); *F41A 27/06* (2013.01)

(58) Field of Classification Search
CPC .............. F41A 23/20; B64D 7/06; B64C 1/14
USPC ........................................................ 89/37.17
See application file for complete search history.

(56) References Cited

U.S. PATENT DOCUMENTS

| | | | | |
|---|---|---|---|---|
| 3,086,425 A | * | 4/1963 | Huey | B64D 7/02 244/3.11 |
| 4,681,013 A | * | 7/1987 | Farley | B64D 1/06 89/1.804 |
| 4,697,764 A | * | 10/1987 | Hardy | B64D 1/06 244/137.4 |
| 5,657,947 A | * | 8/1997 | Mayersak | F41G 7/007 244/3.19 |
| 5,683,061 A | * | 11/1997 | Hardy | B64C 1/0009 244/118.1 |
| 5,775,641 A | * | 7/1998 | Goon | B64C 1/22 244/118.1 |
| 5,866,838 A | * | 2/1999 | Mayersak | F41G 7/007 89/1.51 |
| 6,460,445 B1 | * | 10/2002 | Young | B64D 1/06 244/137.4 |

OTHER PUBLICATIONS

"AC-130A/E/H/U—Gunship," C-130.net, <http//www.c-130.net/c-130-versions-article3.html>, 2016, 7.
Nieuwint, "Lockheed AC-130 Gunship: Death From Above", War History Online, Military Vehicles, Nov. 4, 2015, 5 pages.

* cited by examiner

*Primary Examiner* — Samir Abdosh
(74) *Attorney, Agent, or Firm* — Toler Law Group, PC

(57) ABSTRACT

A device for mounting a weapon system to an aircraft includes an adaptor to couple to an internal structure of the aircraft. The device also include a gun mount and a deployment system. The deployment system is coupled to the adaptor to the gun mount and is configured to move the gun mount from a first position internal to the aircraft to a second position at least partially external to the aircraft.

20 Claims, 23 Drawing Sheets

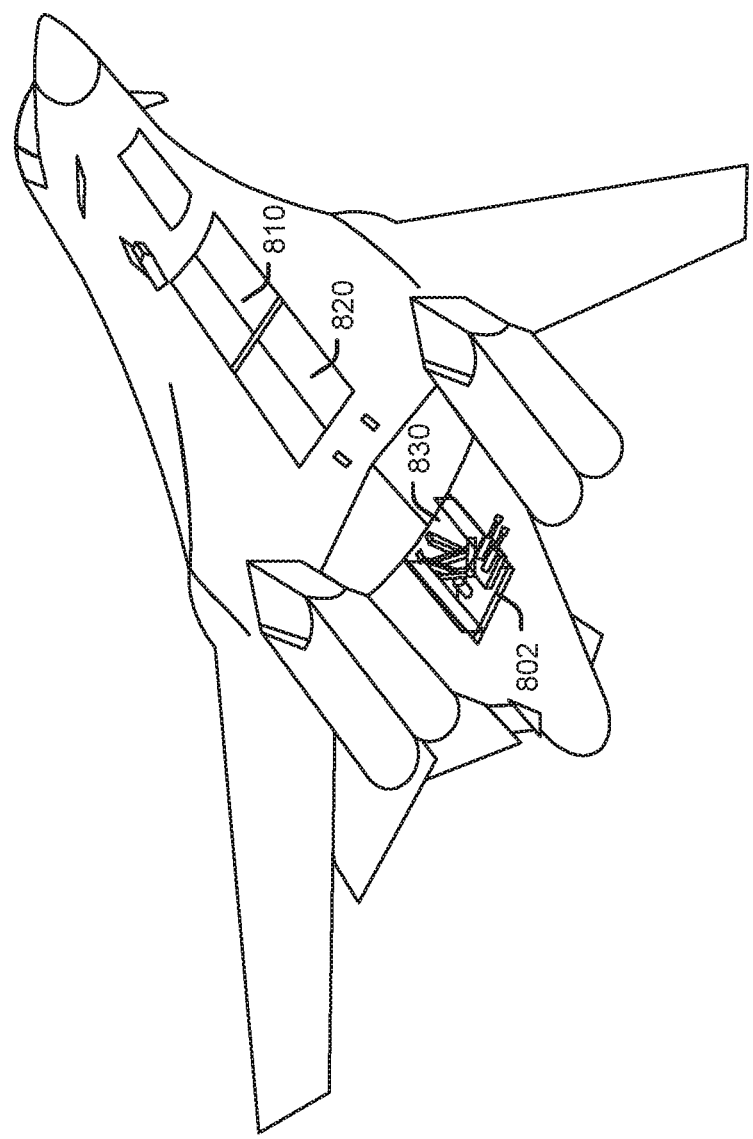
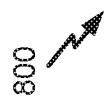
FIG. 8

SYSTEM AND METHOD FOR DEPLOYMENT OF AN AIRCRAFT WEAPONS SYSTEM

FIELD OF THE DISCLOSURE

The present disclosure is generally related to installation, operation, and deployment of an aircraft weapons system.

BACKGROUND

When designing an aircraft, projectile firing weapons systems are typically mounted internally in the aircraft. For example, the projectile firing weapons systems are typically mounted longitudinally (e.g., parallel to a roll axis of the aircraft) and fire projectiles through a fixed cowling or fairing of the aircraft. Some projectile firing weapons systems are fixedly coupled to the aircraft with a barrel that protrudes from a side of the fuselage. Operating the aircraft with a protruding barrel can negatively affect performance. For example, the protruding barrel may increase drag and reduce performance, such as endurance, speed, etc. As another example, an opening through which the barrel protrudes may cause wind buffeting which increases drag and stress on structures or an airframe of the aircraft.

When retrofitting an existing aircraft to include a projectile firing weapons system, the configurations described above may be hindered due to existing equipment or space constraints. In some implementations, a retrofit weapons system may be attached to an external structure (e.g., a hardpoint) of the aircraft. For example, a fixed (e.g., non-extendable or retractable) gun pod may be coupled to an external hardpoint on a wing or the fuselage of the aircraft. However, attaching a retrofit weapons system to an aircraft's exterior may interfere with airflow over the aircraft's surfaces (e.g., decreases lift and increases drag), which negatively affects aircraft performance (e.g., speed, maneuverability, operating ceiling, mission length, etc.).

SUMMARY

In a particular implementation, a device for mounting a weapon system to an aircraft includes an adaptor to couple to an internal structure of the aircraft. The device also include a gun mount and a deployment system. The deployment system is coupled to the adaptor and to the gun mount and is configured to move the gun mount from a first position internal to the aircraft to a second position at least partially external to the aircraft.

In another particular implementation, a method of operating an aircraft based weapons system includes opening a bay door of an aircraft and extending a gun mount at least partially through the bay door using a deployment system coupled via an adaptor to an internal structure of the aircraft.

In another particular implementation, a method of installing a weapons system on an aircraft includes accessing a weapons bay of the aircraft by opening or removing a bay door and coupling an adaptor to an internal structure of the aircraft located in the weapons bay. The method also includes coupling a deployment system and a gun mount to the adaptor, where the deployment system is configured to move the gun mount from a first position internal to the aircraft to a second position at least partially external to the aircraft.

BRIEF DESCRIPTION OF THE DRAWINGS

FIG. 8 is a diagram that illustrates a second particular example of a weapons system coupled to an aircraft;

DETAILED DESCRIPTION

Figure 1:
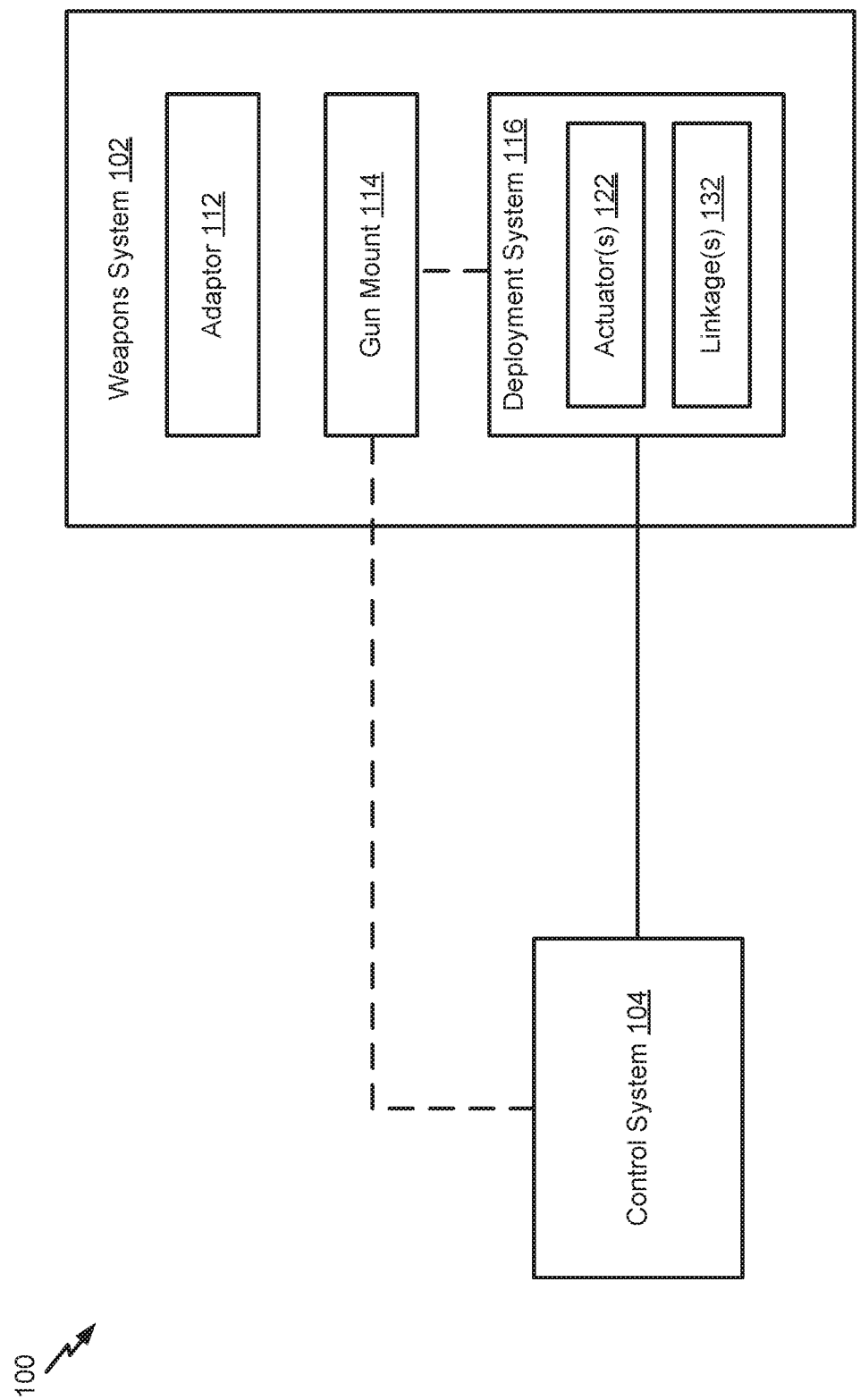
FIG. 1 is a block diagram that illustrates an example of a system for deploying a weapons system.

Implementations disclosed herein are directed to a system for deploying a weapons system and methods for operation and installation of the weapons system. A system for deploying a weapons system may include a control system communicatively coupled to the weapons system. The control system may be integrated into an existing control system of the aircraft or may be separate from the existing control system of the aircraft. The control system may be configured to control deployment of the weapons system from a first position internal to the aircraft to a second position at least partially external to the aircraft. For example, the control system may transmit and receive signals configured to control extension and retraction of the weapons system between the first position and the second position.

The weapons system includes an adaptor, a gun mount, and a deployment system. The adaptor may be coupled to an internal structure of the aircraft. In a particular implementation, the adaptor is coupled to rotary launcher mounts or spline mounts of a weapons bay of the aircraft. The gun mount and the deployment system are coupled to the adaptor. The gun mount may be coupled to a weapon or another weapons system, such as a laser. In some implementations, the gun mount is movable or rotatable to aim the weapon. The deployment system may include one or more actuators and one or more linkages to move (e.g., extend and retract) the gun mount between the first position internal to the aircraft and the second position at least partially external to the aircraft.

In some implementations, the control system may be further configured to control movement of weapons bay doors, the gun mount, or a combination thereof. For example, the control system may transmit and receive signals configured to control opening and closing of the weapons bay doors. As another example, the control system may transmit and receive signals configured to control rotation or aiming of the gun mount.

In a particular illustrative implementation an aircraft may be retrofit to include the weapons system. For example, a rotary launcher of a weapons bay (e.g., a bomb bay) may be removed and replaced with the weapons system. An aircraft that includes the weapons system may have increased performance as compared to an aircraft that includes a conventional retrofit weapons systems. For example, speed, lift, maneuverability, endurance, response time, and operational distance of the aircraft may be increased and drag produced by the aircraft may be reduced. By mounting the weapons systems within a weapons bay, the aircraft may operate at supersonic speeds when the weapons systems is retracted, extended, or both. By including moldings, hatches, or doors, reductions in performance from operating the aircraft with a cavity or opening may be reduced. By including a weapons system on board an aircraft, functionality of the aircraft may increase and the aircraft may gain additional capabilities. For example, a bomber may be able to provide close-air-support or better support ground troops. Accordingly, a single aircraft may be able to cover a larger area and perform multi-function/mission capabilities, as compared to aircraft without a weapons system.

Further, by using compound movements (e.g., movement in multiple directions) the weapons system may be configured to deploy a weapon that is larger (e.g., longer) than a dimension of an opening through which the weapon and the gun mount are deployed. By using compound movements the weapons system may be installed or retrofit within a smaller space on-board an aircraft or on smaller aircraft as compared to a weapons system that deploys the weapon and the gun mount by movement in one direction.

Additionally, by using transverse mounted weapons or rotatable gun mounts, the aircraft may provide ground support more safely and for a longer period of time as opposed to aircraft that fire a longitudinally mounted projectile weapons through a fixed cowling. For example, the aircraft may fly at a bank angle in a loop surrounding a particular area as opposed to an aircraft having longitudinal (e.g., roll axis) mounted guns that performs multiple high pitch angle strafing runs directly over the target.

FIG. 1 illustrates an example of a system 100 for deploying a weapons system 102. The system 100 is configured for use on an aircraft as described further herein. The system 100 includes the weapons system 102 and a control system 104. The system 100 may be operable to deploy a weapon (or a mount thereof) from a first position internal to the aircraft to a second position at least partially external to the aircraft.

The weapons system 102 includes an adaptor 112, a gun mount 114, and a deployment system 116. The adaptor 112 is configured to couple to an internal structure of the aircraft. To illustrate, the adaptor 112 may be coupled to the internal structure via a mount, a bracket, a support or a combination thereof. As illustrative, non-limiting examples, the adaptor 112 may be configured to couple to a support for a rotary launcher or a spline mount in a weapons bay (e.g., a bomb bay) of the aircraft. Additionally or alternatively, the adaptor 112 may be configured to couple to door mounts (e.g., hinges) or to door supports of the weapons bay doors. As other illustrative, non-limiting examples, the adaptor 112 may be configured to couple to a bomb rack, a missile rack, an internal hardpoint, a bulkhead, or a spar (e.g., a wing spar) of the aircraft.

The gun mount 114 is coupled to the adaptor 112 and the deployment system 116. The gun mount 114 may include one or more actuators and one or more linkages configured to move, rotate, or aim a weapon relative to the aircraft. For example, the gun mount 114 may rotate the weapon from a first orientation to a second orientation. The first orientation may include or correspond to a stowage orientation and the second orientation may include or correspond to an engagement or active orientation. As an illustrative, non-limiting example, the first orientation is a longitudinal alignment (e.g., aligned with or parallel to a roll axis of the aircraft), and the second orientation is a transverse alignment (e.g., aligned with or parallel to a pitch axis of the aircraft). In such implementations, the gun mount 114 may be fixed or movable (e.g., aimable). As used herein, aligned with and parallel to include substantially aligned with and substantially parallel to. As another example, the gun mount 114 may be configured to aim the weapon to align or track a target. To illustrate, the gun mount 114 (e.g., a movable or aimable gun mount) may adjust an aiming direction of the weapon relative to a yaw axis of the aircraft, a pitch of axis of the aircraft, or both. Specifically, the one or more actuators and the one or more linkages of the gun mount 114 may adjust an elevation (or depression) angle of the weapon or a yaw angle (e.g., a heading) of the weapon with respect to elevation and yaw angles of the aircraft. Additionally or alternatively, the one or more actuators and the one or more linkages of the gun mount 114 may move or rotate the gun mount 114 or an aiming direction of the weapon relative to the aircraft. Actuators as used herein may include electric powered actuators, hydraulic powered actuators, pneumatic powered actuators, or a combination thereof. Additionally, the actuators may include linear type actuators, rotary type actuators, or a combination thereof. As illustrative, non-limiting examples, an actuator may include or correspond to a jack screw, a rack and a pinion, or a worm drive.

In some implementations, the gun mount 114 may be configured to couple to one or more weapons. A weapon may include or correspond to a machine gun, a chain gun, a cannon, an autocannon, a rail gun, a projectile firing device, or a laser weapon. The one or more weapons may include different types of weapons. For example, the gun mount 114 may be coupled to a machine gun and a rail gun. As another example, the gun mount 114 may be coupled to different types of machine guns.

The deployment system 116 is coupled to the adaptor 112 and the gun mount 114. The deployment system 116 is configured to move the gun mount 114 from a first position internal to the aircraft to a second position at least partially external to the aircraft. The deployment system 116 includes one or more actuators 122 and may include one or more linkages 132. The one or more actuators 122 may be coupled to the one or more linkages 132 and may be configured to move, rotate, or both, the one or more linkages 132 to move the gun mount 114 between the first position and the second position. In some implementations, the deployment system 116 may move the gun mount 114 between the first position and the second position by movement (e.g., simple movement) in one direction. For example, the deployment system 116 may extend (e.g., lower) the gun mount 114 beneath the aircraft parallel to a yaw axis of the aircraft. In other implementations, the deployment system 116 may move the gun mount 114 between the first position and the second position by movement (e.g., compound movement) in multiple directions. For example, the deployment system 116 may rotate (e.g., swing) the gun mount 114 towards a nose of the aircraft (e.g., forward) and lower the gun mount 114 beneath the aircraft at the same time, or the deployment system 116 may move the gun mount 114 in a first direction in a first stage and move (or rotate) the gun mount 114 in a second direction in a second stage.

Devices and components of the weapons systems 102 may be coupled to one another via fasteners. As illustrative, non-limiting examples, the fasteners may include or correspond to pins, brackets, pivots, screws, bolts, nuts, anchors, rivets, hooks, etc. To illustrate, a first linkage and a second linkage may be coupled (e.g., pivotably coupled) via a pin. As another illustrative, non-limiting example, the first linkage may be coupled (e.g., pivotably coupled) to the adaptor 112 via two brackets and a pin.

The weapons system 102 is coupled (e.g., communicatively coupled) to the control system 104. For example, the weapon system 102 may be coupled to the control system 104 via a wired network (e.g., one or more buses on board the aircraft) or a wireless network. As illustrated in FIG. 1, the control system 104 is coupled to the deployment system 116 of the weapons system 102. To illustrate, the control system 104 is coupled to the one or more actuators 122 of the deployment system 116. In some implementations, the control system 104 may also be coupled to the gun mount 114. For example, the control system 104 may be coupled to the gun mount 114 directly or indirectly (e.g., via the deployment system 116), as indicated by dashed lines in FIG. 1. To illustrate, the control system 104 may be coupled to the one or more actuators of the gun mount 114.

The control system 104 may be configured to control movement of the gun mount 114, movement of the deployment system 116, or both. For example, the control system 104 may transmit and receive signals configured to activate the one or more actuators of the gun mount 114 and to activate the one or more actuators 122 of the deployment system 116. Additionally, the control system 104 may be configured to control (e.g., open and close) the weapons bay doors, operate the weapon, or both. For example, the control system 104 may transmit signals configured to disengage (e.g., release) a safety of the weapon, fire the weapons and engaged the safety. As an illustrative, non-limiting example, the control system 104 includes a processor, a memory, and a user input device. The memory stores computer-readable instructions executable by the processor. The processor is coupled to the memory and configured to execute the computer-readable instructions. The user input device is coupled to the processor and the processor is configured to initiate transmission of signals to the weapons system 102 responsive to receiving inputs from the user input device.

During operation of the aircraft, the control system 104 may transmit a first signal to open weapons bay doors and create or expose an opening into the weapons bay. Alternatively, the weapons bay doors may be fixed and may include the opening. The control system 104 may transmit a second signal to deploy the weapons system 102. For example, the control system 104 may transmit the second signal to the one or more actuators 122 of the deployment system 116. The one or more actuators 122 may move the one or more linkages 132 of the deployment system 116 to extend the gun mount 114 from the first position internal to the aircraft to the second position at least partially external to the aircraft. To illustrate, at least a portion of the gun mount 114 is extended through the opening and protrudes from the aircraft.

The control system 104 may transmit a third signal to rotate the gun mount 114 or to aim the weapon. The control system 104 may transmit the third signal to the one or more actuators of the gun mount 114. The one or more actuators of the gun mount may move or reposition the one or more linkages of the gun mount 114 to rotate the gun mount 114, the weapon, or both, from the first orientation (e.g., the stowage orientation) to the second orientation (e.g., the engagement orientation). Additionally or alternatively, the one or more actuators of the gun mount 114 may move or reposition the one or more linkages of the gun mount 114 to aim the gun mount 114, the weapon, or both. To illustrate, a first actuator (e.g., a gun laying drive) of the gun mount 114 may adjust an aiming direction of the weapon relative to a yaw axis of the aircraft. A second actuator (e.g., an elevation or stowage actuator) may adjust the aiming direction of the weapon relative to a pitch axis of the aircraft.

While the gun mount 114 is in the second position, the aircraft may provide close-air-support, execute one or more maneuvers, or both. As illustrative, non-limiting examples, the aircraft may execute a linear strafe, a pylon turn (e.g., a long-line loiter), fly in an orbit around a target location, or another maneuver. To illustrate, the aircraft may execute the pylon turn such that, during the pylon turn (or pylon loop), the aiming direction of a weapon of the aircraft is relatively fixed on a target location or area. The control system 104 may transmit a fourth signal to operate the weapon. For example, the control system 104 may transmit the fourth signal to the gun mount 114 or to the weapon to disengage the safety, fire the weapon, engage the safety, or a combination thereof.

The control system 104 may transmit a fifth signal to retract the weapons system 102. The control system 104 may transmit the fifth signal to the one or more actuators 122 of the deployment system 116. The one or more actuators 122 may move or reposition the one or more linkages 132 to retract the gun mount 114 from the second position at least partially external to the aircraft to the first position internal to the aircraft. The control system 104 may transmit a sixth signal to close the weapons bay doors to close or seal the opening into the weapons bay of the aircraft.

In other implementations, the weapons system 102 includes the adaptor 112 and the gun mount 114. In such implementations, the weapons system does not include the deployment system 116, the control system 104, or both. Such implementations are described with reference to FIGS. 18-20.

An aircraft that includes the weapons system may have increased performance as compared to an aircraft that includes a weapons system with a barrel protruding from the fuselage of the aircraft. For example, speed, lift, maneuverability, endurance, response time, and operational distance of the aircraft may be increased and drag produced by the aircraft may be reduced. To illustrate, by mounting the weapons systems within a weapons bay, the aircraft may operate at supersonic speeds when the weapons systems is retracted, extended, or both. By including moldings, hatches, or doors, reductions in performance from operating the aircraft with a cavity or opening may be reduced. By including a weapons system on board an aircraft, functionality of the aircraft may increase and the aircraft may gain additional capabilities. For example, a bomber may be able to provide close-air-support or better support ground troops. Accordingly, a single aircraft may be able to cover a larger area and perform multi-function/mission capabilities, as compared to aircraft without a weapons system.

Additionally, by using transverse mounted weapons or rotatable gun mounts, the aircraft may provide ground support more safely and for a longer period of time as opposed to aircraft that fire a longitudinally mounted projectile weapons through a fixed cowling. For example, the aircraft may fly at a bank angle in a loop surrounding a particular area as opposed to an aircraft having longitudinal (e.g., roll axis) mounted guns that performs multiple high pitch angle strafing runs directly over the target.

Further, an aircraft that includes the weapons system may have a lower radar cross section that an aircraft that includes a weapons system with a barrel protruding from the fuselage of the aircraft. Thus, the aircraft may be able to fly in a stealth configuration (e.g., a lower radar cross section configuration) to and from a target location as compared to the aircraft with the barrel protruding from the fuselage that cannot transition into in a stealth configuration.

Figure 2:
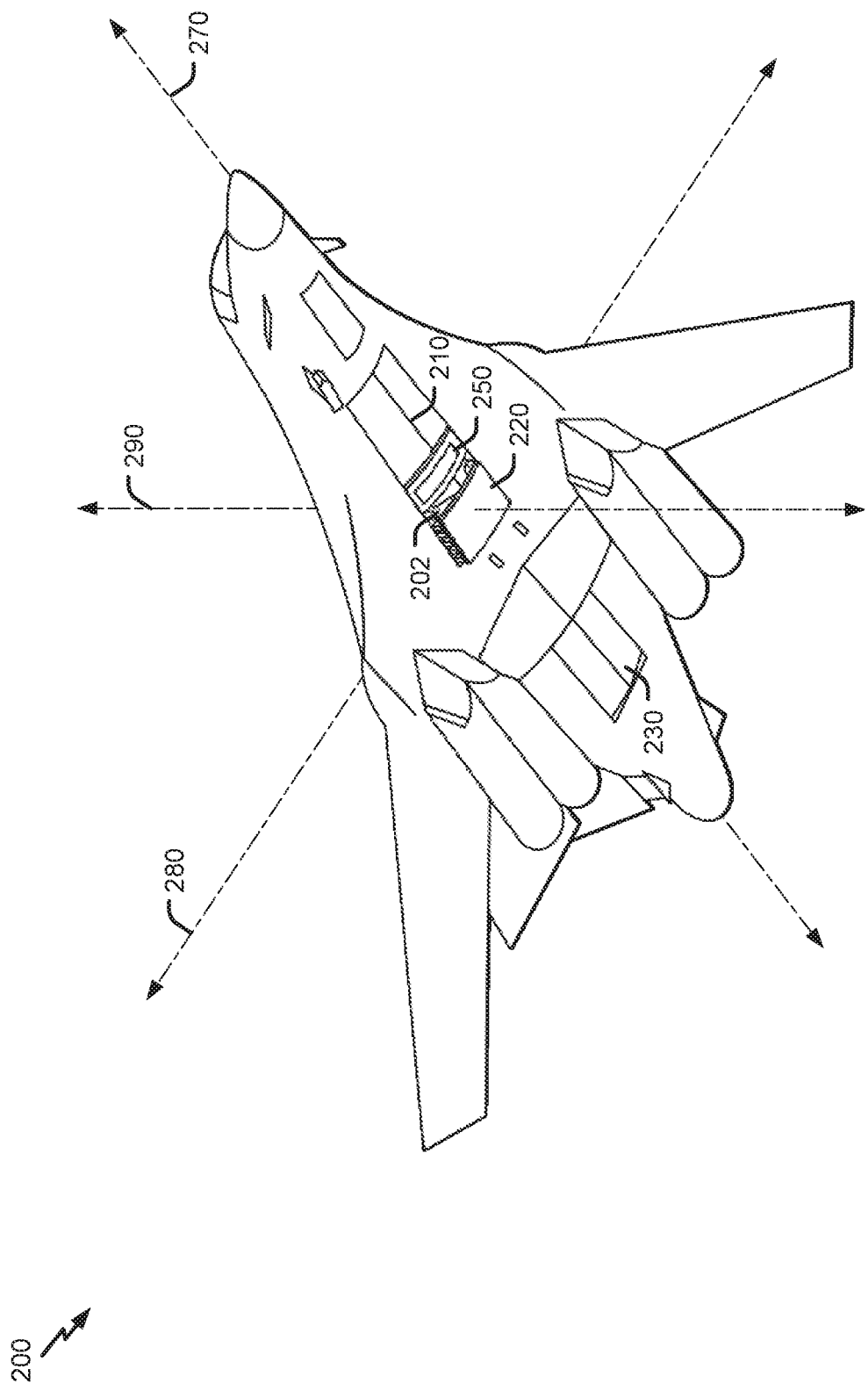
FIG. 2 is a diagram that illustrates a first particular example of a weapons system coupled to an aircraft.

FIG. 2 is a diagram that illustrates a particular example of an aircraft 200 that includes a weapons system 202. The weapons system 202 may include or correspond to the weapons system 102 of FIG. 1. The aircraft 200 may include one or more internal bays, such as internal bays 210, 220, and 230. The internal bays 210, 220, and 230 may include or correspond to weapons bays (e.g., a bomb bay). The aircraft 200 may include or correspond to a fighter, a bomber, a transport aircraft, or an unmanned aircraft (e.g., a drone). As illustrative, non-limiting examples, the aircraft 200 may include the B-1 Lancer, the B-2 Spirit, the B-52 Stratofortress, the F-22 Raptor, the F-35 Lightning II, a next generation aircraft (e.g., the Long Range Strike Bomber B-21), or an aircraft that includes an internal bay.

The weapons system 202 may be installed (e.g., retrofitted) in one or more of the internal bays 210, 220, and 230 of the aircraft 200. As illustrated in FIG. 2, the weapons system 202 is located in a second internal bay 220. The weapons system 202 is described in greater detail in FIGS. 3-7. In some implementations, weapons bay doors of the aircraft 200 may be replaced when installing the weapons system 202. For example, first (e.g., original) weapons bay doors of the second internal bay 220 have been removed and replaced with the weapons system 202 and an access hatch 250. As illustrated in FIG. 2, the access hatch 250 is upstream of the weapons system 202 in an airflow of the aircraft 200. In other implementations, the access hatch 250 may be downstream of the weapons system 202 in the airflow.

The aircraft 200 has three axes 270, 280, 290. As illustrated in FIG. 2, a roll (e.g., longitudinal) axis 270 extends through the fuselage of the aircraft from forward to aft. A pitch (e.g., lateral or transverse) axis 280 extends across wings of the aircraft. A yaw (e.g., vertical or normal) axis 290 extends through the fuselage of the aircraft 200. Rotating about an axis changes an angle of the aircraft 200. For example, rotating about the pitch axis 280 changes a pitch angle of the aircraft 200.

In some implementations, the aircraft 200 may include molding, fairings, cowlings, or a combination thereof. The molding, fairings, and cowlings may be attached or coupled to the aircraft 200 (e.g., an exterior of the aircraft 200) to compensate for changes to air flow over the aircraft 200 caused by modifications to the aircraft 200, caused by the weapons system 202 protruding from the aircraft 200 when the weapons system 202 is in an extended state, or both. The molding, fairings, and cowlings may be configured to alter the air flow over the aircraft 200 and decrease drag and stress on the aircraft 200. The molding, fairings, and cowlings are described with reference to FIGS. 14-17.

Figure 3:
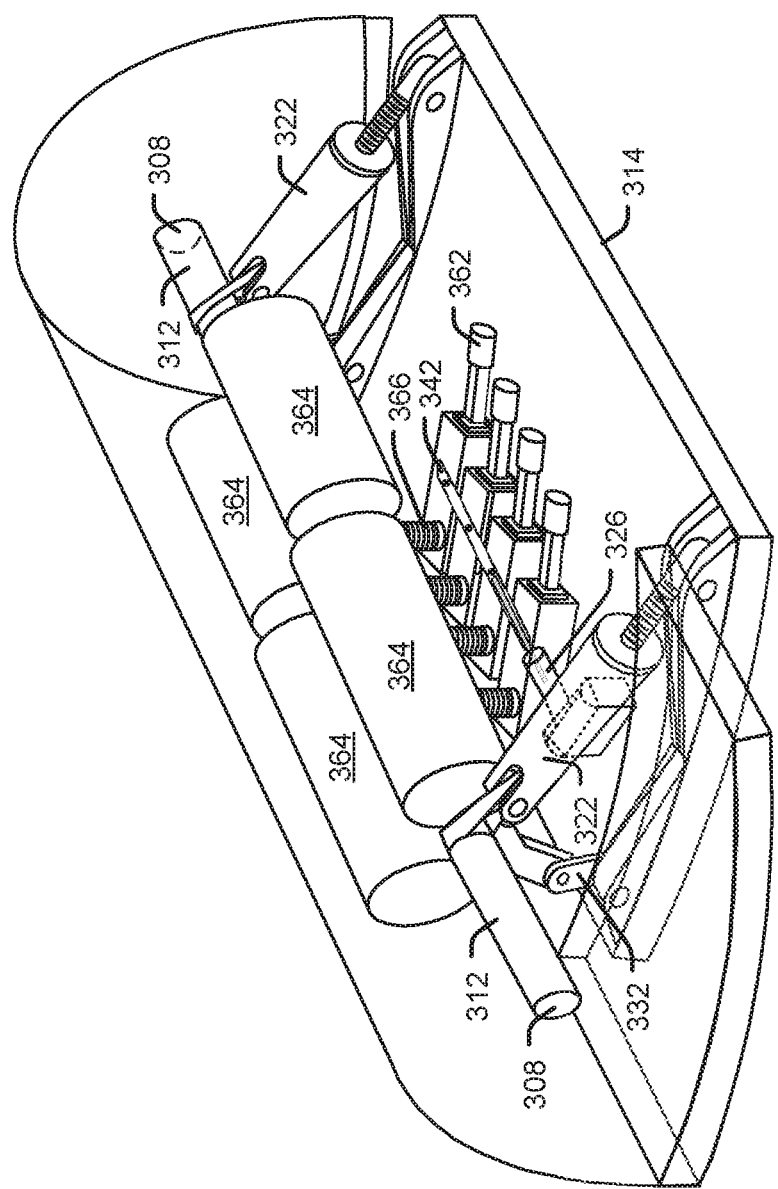
FIG. 3 is a diagram that illustrates an isometric view of the first particular example of the weapons system.

FIG. 3 is a diagram that illustrates a particular example of an isometric view 300 of the weapons system 202. The weapons system 202 includes an adaptor 312, a gun mount 314, and a deployment system. The adaptor 312 is configured to couple to an internal structure 308 of the aircraft 200. The adaptor 312 may include or correspond to the adaptor 112 of FIG. 1. In some implementations, the adaptor 312 may be configured to couple to door lugs in addition to the internal structure 308, as described with reference to FIG. 4. The adaptor 312 is fixed (e.g., not moveable relative to the internal structure 308) and is coupled to the gun mount 314 (e.g., a tray) via the deployment system. To illustrate, the adaptor 312 is coupled to the gun mount 314 via one or more pivotable actuators 322 and a slew pivot 332 (e.g., slew pivot linkage). The adaptor 312 may include or correspond to a frame or one or more support structures of the weapons system 202.

The gun mount 314 includes (or is coupled to) a gun laying drive 326 and a gun laying linkage 342. The gun laying drive 326 and the gun laying linkage 342 may be configured to rotate or aim the one or more weapons 362, as further described with reference to FIG. 7. The gun mount 314, the gun laying drive 326, and the gun laying linkage 342 may include or correspond to the gun mount 114 of FIG. 1.

The deployment system includes the one or more pivotable actuators 322, the slew pivot 332, and an extension stop (not shown). The extension stop is described with reference to FIGS. 4-7. The deployment system is configured to move the gun mount 314 from a first position internal to the aircraft to a second position at least partially external to the aircraft, as described further with reference to FIGS. 4-7. The deployment system may include or correspond to the deployment system 116 of FIG. 1. For example, the one or more pivotable actuators 322 may include or correspond to the one or more actuators 122, and the slew pivot 332 may include or correspond to the one or more linkages 132 of FIG. 1.

In some implementations, the gun mount 314 (e.g., the tray) may correspond to weapons bay doors. For example, the gun mount 314 may be flush or in plane with exterior surfaces of the aircraft and may substantially seal the weapons bay from an exterior airflow over the aircraft. To illustrate, the gun mount 314 may direct air away from entering the internal bay 220. In other implementations, the aircraft may include weapons bay doors (not shown). The weapons bay doors may seal the weapons bay when closed and may open prior to extending the gun mount 314. In a particular implementation, the aircraft includes sealing doors. The sealing doors may replace the original weapons bay doors and the gun mount 314 may be enclosed within the aircraft when the sealing doors are closed. The gun mount 314 may be external to the aircraft when the sealing doors are opened.

Ammunition containers 364 may be coupled to the adaptor 312. For example, the ammunition containers 364 may be mounted on brackets or supports of the adaptor 312. In other implementations, the ammunition containers 364 may be coupled to the gun mount 314, the deployment system, or other internal structures of the aircraft. The ammunition containers 364 may be configured to store ammunition and to provide the ammunition to the one or more weapons 362. For example, a particular ammunition container of the ammunition containers 364 may feed an ammunition belt 366 to a particular weapon of the one or more weapons 362. As illustrated in FIG. 3, the ammunition containers 364 are oriented lengthwise (e.g., parallel to the roll axis 270). In other implementations the ammunition containers 364 may be oriented in other directions or stacked. Operation of the weapons system 202 is described with reference to FIGS. 4-7.

Figure 4:
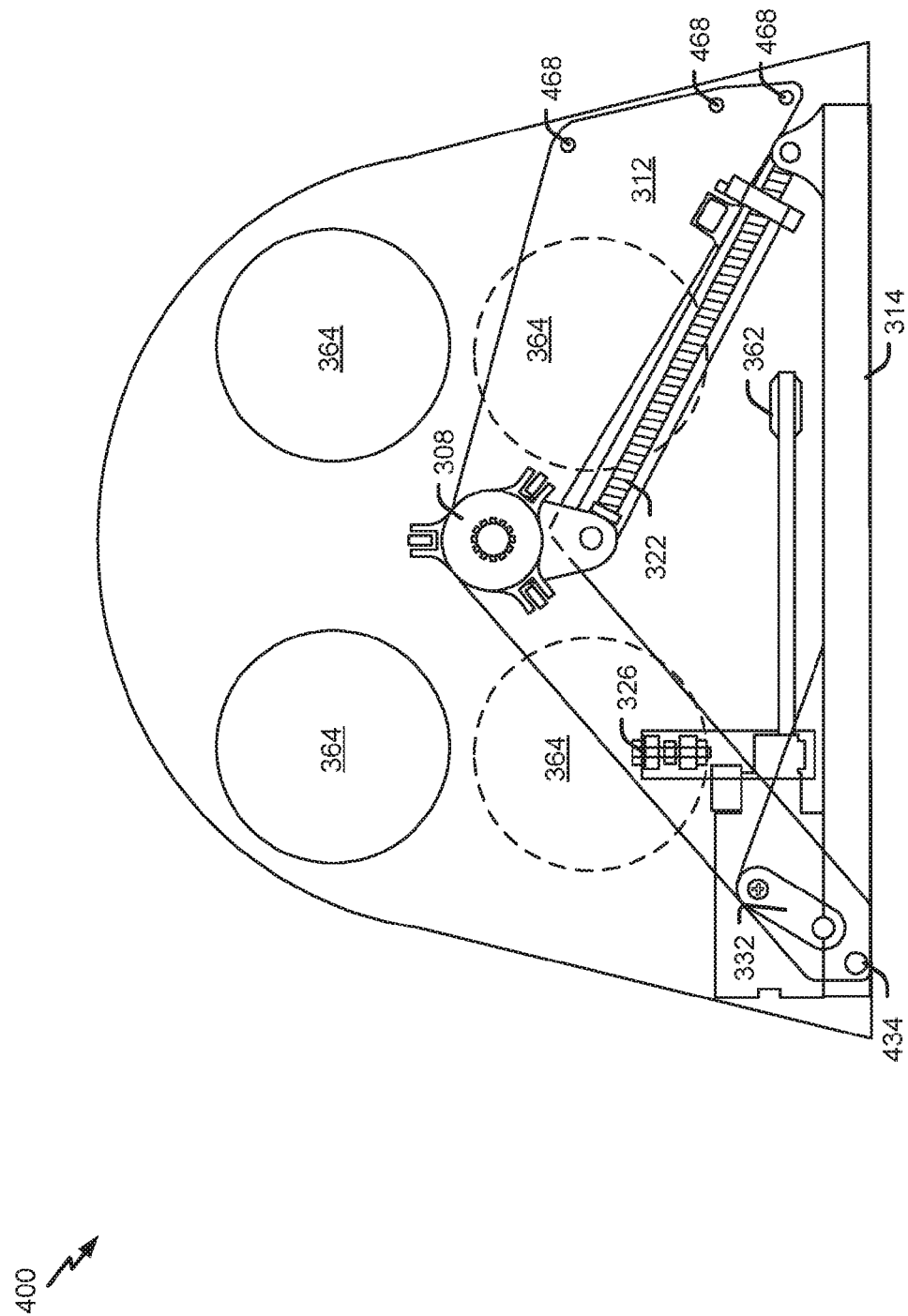
FIG. 4 is a diagram that illustrates a front view of the first particular example of the weapons system in a retracted state.

FIG. 4 is a diagram that illustrates a particular example of a front view 400 of the weapons system 202 in a retracted state (e.g., a stowage state or position). The retracted state may correspond to the first position.

FIG. 4 depicts the weapons system 202 in an internal bay (e.g., the internal bay 220 of the aircraft 200 of FIG. 2) before deployment. The weapons system 202 may be communicatively coupled to a control system, as described with reference to FIG. 1. As illustrated in FIG. 4, the one or more pivotable actuators 322 are retracted (e.g., a jackscrew of the one or more pivotable actuators 322 is retracted) and the slew pivot 332 is in a first pivot position. The gun mount 314 is retracted within the internal bay 220 of the aircraft 200. The one or more weapons 362 are oriented in the first (e.g., stowage) orientation along (or parallel to) the pitch axis 280.

The weapons system 202 further includes an extension stop 434. The extension stop 434 may be coupled to or part of the deployment system or the adaptor 312. As illustrated in FIG. 4, the extension stop 434 is coupled to the adaptor 312. The extension stop 434 is fixed and configured to stabilize and to control (e.g., restrict or stop) movement of the gun mount 314. For example, the extension stop 434 stabilizes the gun mount 314 during operation (e.g., firing) of the one or more weapons 362. The extension stop 434 is configured to cause the pivotable actuator 322 to rotate the gun mount 314 about a pitch axis (e.g., decrease an elevation angle), as described further with reference to FIG. 6.

In FIG. 3, the ammunition containers 364 were oriented parallel to a roll axis (e.g., longitudinally or lengthwise). FIG. 4 depicts an alternate implementation where the ammunition containers 364 are stacked (e.g., vertically) parallel to the yaw axis 290 of the aircraft 200, as indicated by the dashed ammunition containers 364 in FIG. 4.

Figure 5:
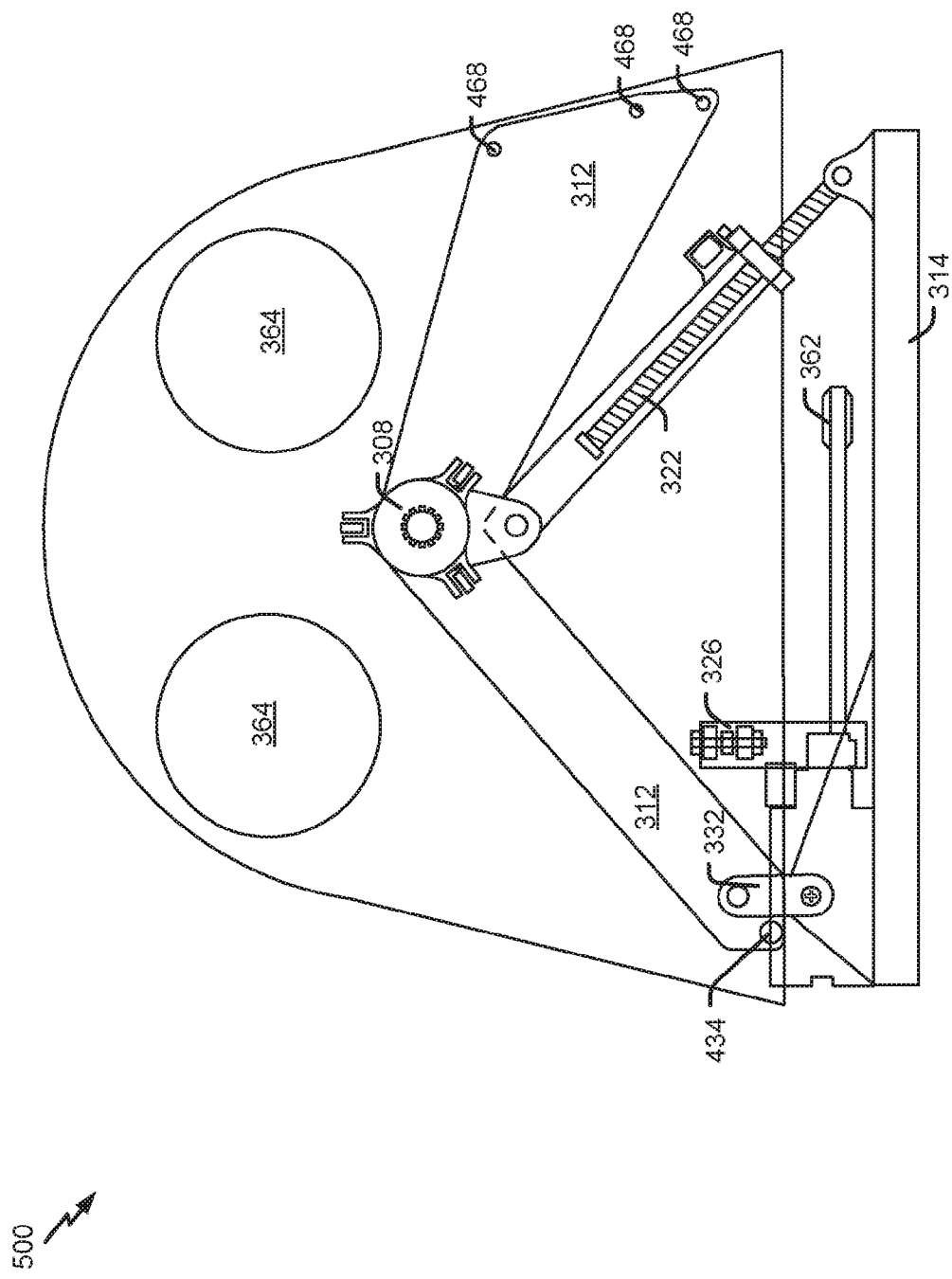
FIG. 5 is a diagram that illustrates a front view of the first particular example of the weapons system in a partially extended state.

FIG. 5 is a diagram that illustrates a particular example of a front view 500 of the weapons system 202 in a partially extended (or retracted) state. The partially extended state may correspond to the second position. The partially extended state may correspond to a state where the gun mount 314 has been lowered beneath the aircraft 200, but where the gun mount 314 has not yet begun to rotate (e.g., an elevation angle of the gun mount 314 is the same).

FIG. 5 depicts the weapons system 202 after the one or more pivotable actuators 322 has been partially extended, and the gun mount 314 has been lowered from the retracted state (e.g., the stowage state). As illustrated in FIG. 5, the one or more pivotable actuators 322 has extended a jackscrew outward from the adaptor 312. Extension of the one or more pivotable actuators 322 may move (e.g., rotate or pivot) the slew pivot 332 from the first pivot position (illustrated in FIG. 4) to a second pivot position. The slew pivot 332 may enable the gun mount 314 (e.g., the tray) to move (e.g., descend and to rotate) from the first position to the second position at least partially external to the aircraft 200. The extension stop 434 may stop the slew pivot 332 from pivoting and the second pivot position may correspond to a pivot position where the slew pivot 332 is in contact with the extension stop 434. In some implementations, the elevation (or depression) angle of the gun mount 314 may remain the same between the retracted state and the partially extended state.

Figure 6:
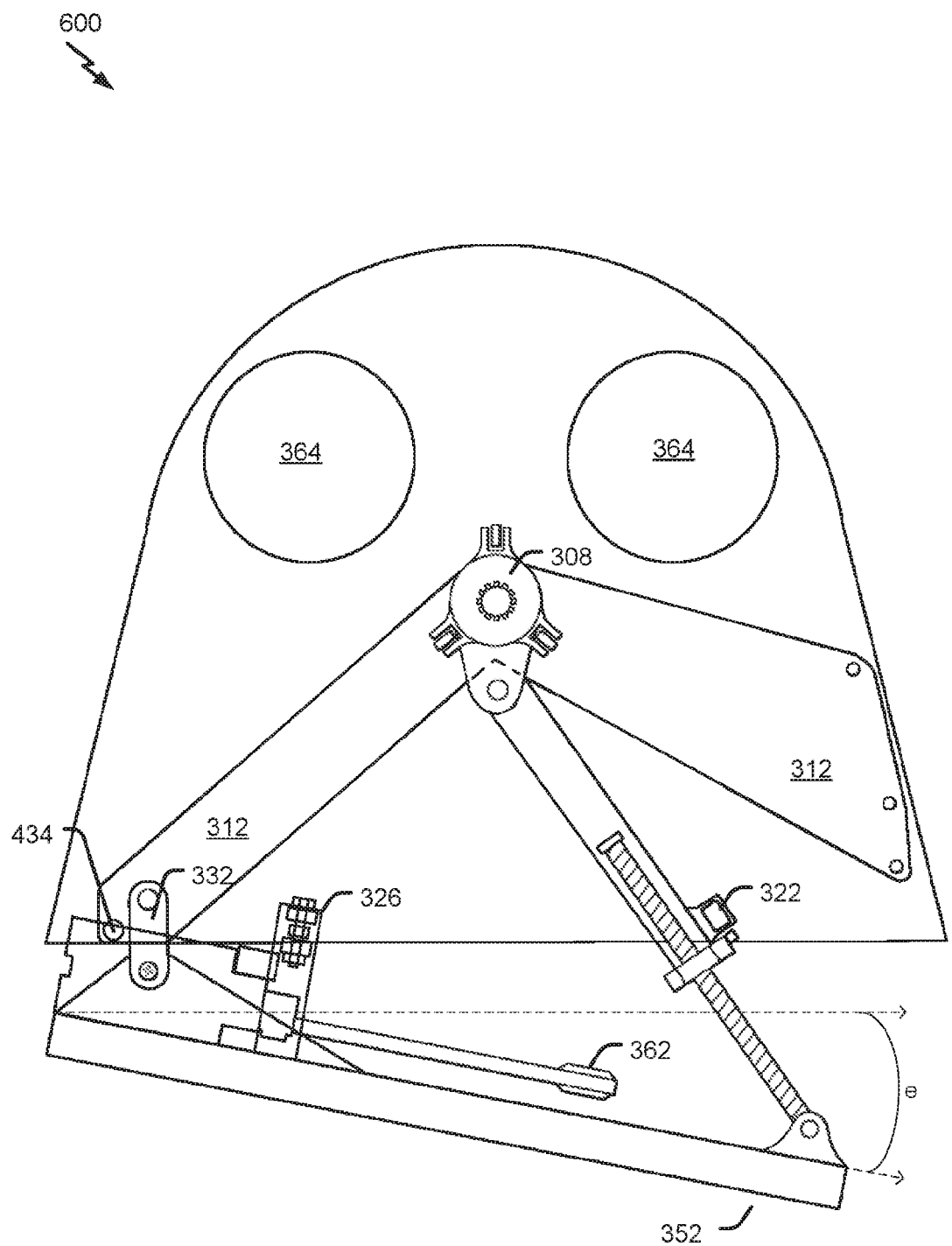
FIG. 6 is a diagram that illustrates a front view of the first particular example of the weapons system in an extended state.

FIG. 6 is a diagram that illustrates a particular example of a front view 600 of the weapons system 202 in the extended state (e.g., an active state or position). The extended state may correspond to the second position. FIG. 6 depicts the weapons system 202 after the one or more pivotable actuators 322 has been extended, and the gun mount 314 has been rotated into the engagement or active state. For example, the elevation (or depression) angle (theta) of the gun mount 314 (and the one or more weapons 362) has changed relative to FIGS. 4 and 5. The extension of the one or more pivotable actuators 322 after the slew pivot 332 is in the second pivot position (e.g., in contact with the extension step) may cause the gun mount 314 to rotate with respect to the aircraft 200. To illustrate, the extension stop 434 forces the one or more pivotable actuators 322 to pivot, the gun mount 314 to rotate, or both, when the one or more pivotable actuators 322 is activated after the gun mount 314 has descended and the slew pivot 332 has moved to the second position in contact with the extension stop 434. The extension stop 434 may maintain an extension position of the gun mount 314 (e.g., prevent the gun mount 314 from over extending) and further extension of the one or more pivotable actuators 322 may rotate the gun mount 314 instead of lowering the gun mount 314.

Additionally, the one or more pivotable actuators 322 may be configured to extend or retract to aim the one or more weapons 362. As illustrated in FIG. 6, the one or more pivotable actuators 322 may adjust a pitch angle of an aiming direction of the gun mount 314 and the one or more weapons 362 relative to the aircraft 200. Alternatively, the gun laying drive 326 may be further configured to aim the one or more weapons by adjusting an angle (e.g., an elevation angle) of the one or more weapons 362 relative to the gun mount 314 and to the aircraft 200.

Figure 7:
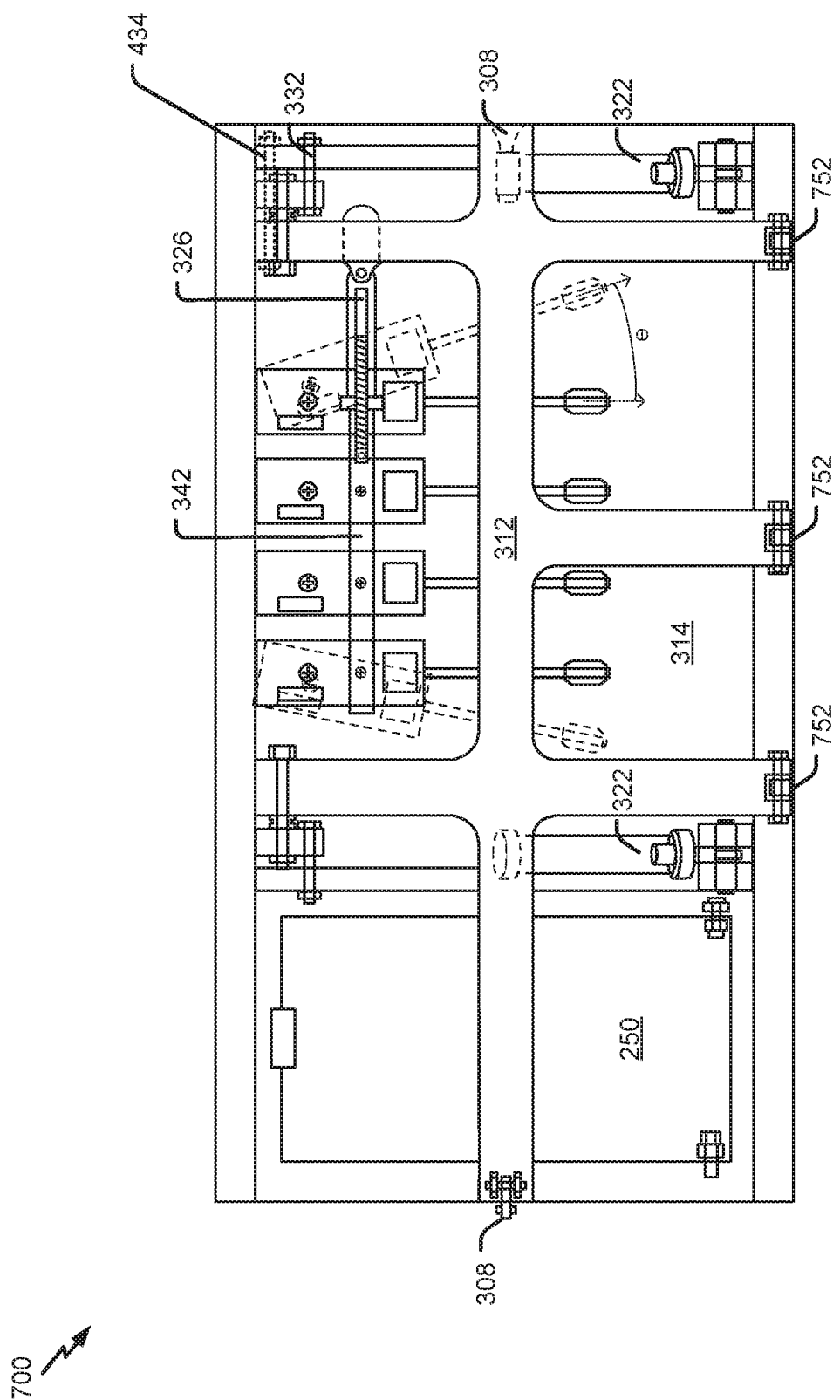
FIG. 7 is a diagram that illustrates a top view of the particular example of the weapons system.

FIG. 7 is a diagram that illustrates a particular example of a top view 700 of the weapons system 202. FIG. 7 depicts the weapons system 202 in the retracted state. In FIG. 7, the ammunition containers 364 have been omitted for clarity and the extension stop 434 is illustrated in dashed lines.

FIG. 7 illustrates movement of the one or more weapons 362. Rotation (e.g., yaw rotation) of the one or more weapons 362 is illustrated in dashed lines. The gun laying drive 326 is coupled to the gun laying linkage 342 and is configured to rotate an aiming direction the one or more weapons 362 relative to the gun mount 314 and the aircraft 200. To illustrate, the gun laying drive 326 may extend or retract a jackscrew to move the gun laying linkage 342 which adjusts a yaw angle (theta) of the one or more weapons 362. The gun laying drive 326 may be configured to adjust the aiming direction the one or more weapons 362 to track a target. The gun laying drive 326 may adjust the aiming direction (e.g., a yaw angle, a pitch angle, or both) to compensate for recoil, flight of the aircraft 200, or movement of the target. In a particular implementation, the gun laying drive 326 includes a linear actuator.

In some implementations, one or more components of the deployment system of the weapons system 202 may be coupled to the aircraft. As illustrated in FIG. 7, a first actuator of the one or more pivotable actuators 322 is coupled to the adaptor 312, and a second actuator of the one or more actuators is coupled to the adaptor 312 and to the internal structure 308.

As illustrated in FIG. 7, the access hatch 250 includes a single opening. Alternatively, the access hatch 250 may include additional openings, such as a split access hatch or a dual access hatch. The access hatch 250 may allow access to the weapons system 202, the one or more weapons 362, the ammunition containers 364, or other components within the internal bay 220. Although the adaptor 312 is illustrated as being coupled to door hinges 752 in FIG. 7, in other implementations, the adaptor 312 may not be coupled to the door hinges 752.

FIG. 8 is a diagram that illustrates a particular example of an aircraft 800 that includes a weapons system 802. The aircraft 800 may include one or more internal bays, such as internal bays 810, 820, and 830. The aircraft 800 may include or correspond to the aircraft 200 of FIG. 2. The weapons system 802 may be installed (e.g., retrofitted) in one or more of the internal bays 810, 820, and 830 of the aircraft 800. As illustrated in FIG. 8, the weapons system 802 is located in a third internal bay 830. The weapons system 802 may include or correspond to the weapons system 102 of FIG. 1 or the weapons system 202 of FIG. 2. The weapons system 802 is described in greater detail in FIGS. 9-13.

Figure 9:
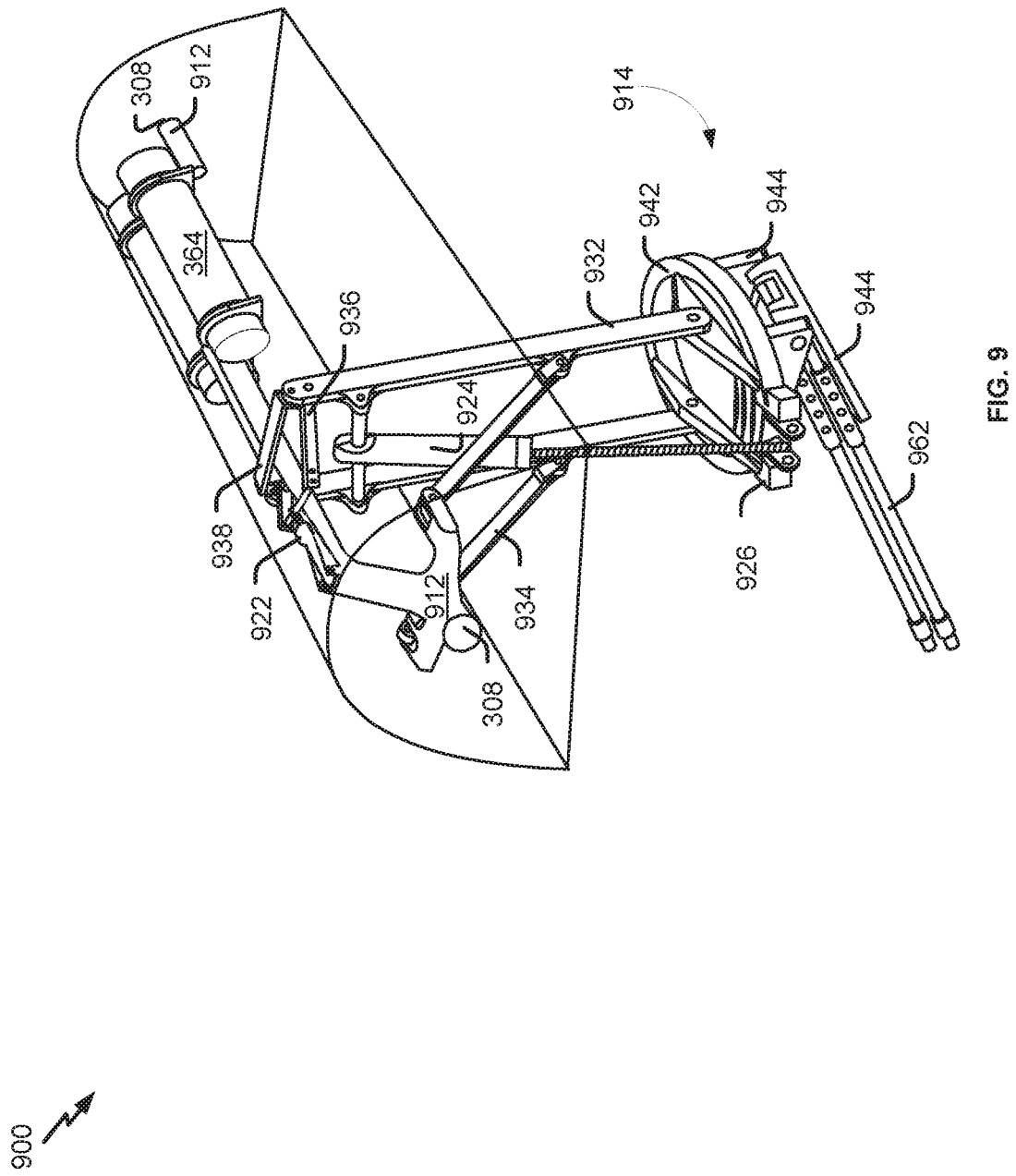
FIG. 9 is a diagram that illustrates an isometric view of the second particular example of the weapons system.

FIG. 9 is a diagram that illustrates a particular example of an isometric view 900 of the weapons system 802. FIG. 9 depicts the weapons system 802 in a deployed or extended state (e.g., the second position at least partially external to the aircraft). The weapons system 802 includes an adaptor 912 configured to couple to an internal structure 308 of the aircraft 800. As illustrated in FIG. 9, the adaptor 912 is coupled to forward and aft internal structures 308. As described with reference to FIG. 1, the internal structure may be a support for a rotary launcher, as an illustrative, non-limiting example. The adaptor 912 is coupled to a gun mount 914 via a deployment system. To illustrate, the adaptor 912 is coupled to the gun mount 914 via one or more adaptors and one or more linkages. The adaptor 912 may include or correspond to a frame or one or more supports of the weapons system 802.

The deployment system includes the one or more actuators, such as a first actuator 922 and a second actuator 924. The deployment system also includes the one or more linkages, such as a main linkage 932, a drag brace linkage 934, and a shortening linkage 936. The main linkage 932 is coupled to the adaptor 912 and the gun mount 914 (e.g., an upper turret 942 of the gun mount 914). As illustrated in FIG. 9, the main linkage 932 is coupled to the adaptor 912 via the drag brace linkage 934 and the shortening linkage 936. Each of the drag brace linkage 934 and the shortening linkage 936 is coupled to the adaptor 912 and to the main linkage 932. Additionally, each of the drag brace linkage 934 and the shortening linkage 936 is pivotable with respect to the adaptor 912 and the main linkage 932.

The first actuator 922 may be coupled to the adaptor 912 and the shortening linkage 936 and may be configured drive the shortening linkage 936 between a first linkage position and a second linkage position. The first actuator 922 may move the main linkage 932, the drag brace linkage 934, and the shortening linkage 936 to extend and partially deploy the gun mount 914.

As the first actuator 922 moves the shortening linkage 936 between the first linkage position and the second linkage position, the shortening linkage 936 may move the other linkages. For example, the shortening linkage 936 moving from the first linkage position to the second linkage position may pivot and extend the main linkage 932 and the drag brace linkage 934 away from and beneath the aircraft 800 to extend and partially deploy the gun mount 914. In some implementations, the weapons system 802 may include an uplock 938 (e.g., an uplock linkage) configured to lock or retain the main linkage 932 in the second linkage position.

The second actuator 924 may be coupled to the main linkage 932 and the gun mount 914. The second actuator 924 may be configured move (e.g., rotate) the gun mount 914 into an active state or engagement state. To illustrate, the actuator 924 may rotate the gun mount 914 about a pitch axis away from the aircraft (e.g., downwards to decrease a pitch angle) to fully deploy the gun mount 914.

The gun mount 914 may include an upper turret 942, a lower turret 944, a gun laying drive 926, and an elevation actuator (not shown for clarity). The upper turret 942 of the gun mount 914 may be rotatable with respect to the main linkage 932 and the lower turret 944 of the gun mount 914 may be rotatable with respect to the upper turret 942. To illustrate, the upper turret 942 may rotate about a pitch axis of the aircraft 800 to deploy the one or more weapons 962 into the engagement position. When in the engagement position, the upper turret 942 is fixed with respect to the main linkage 932 and the lower turret 944 is rotatable about a yaw axis and the pitch axis of the aircraft 800 to adjust the aiming direction of the one or more weapons 962, as further described with reference to FIGS. 10-12. The gun laying drive 926 may be configured to rotate or aim the one or more weapons 962 as described with reference to FIG. 12. Additionally or alternatively, an elevation actuator (not shown for clarity) may be configured to aim the one or more weapons 962. The elevation actuator is described further with reference to FIGS. 10-13.

Weapons bay doors, access hatches, and sealing doors of the aircraft 800 have been omitted from FIGS. 9-12 for clarity. The weapons bay doors, the access hatches, and the sealing doors of the aircraft 800 are described further with reference to FIG. 13. Operation of the weapons system 802 is described with reference to FIGS. 10-13.

Figure 10:
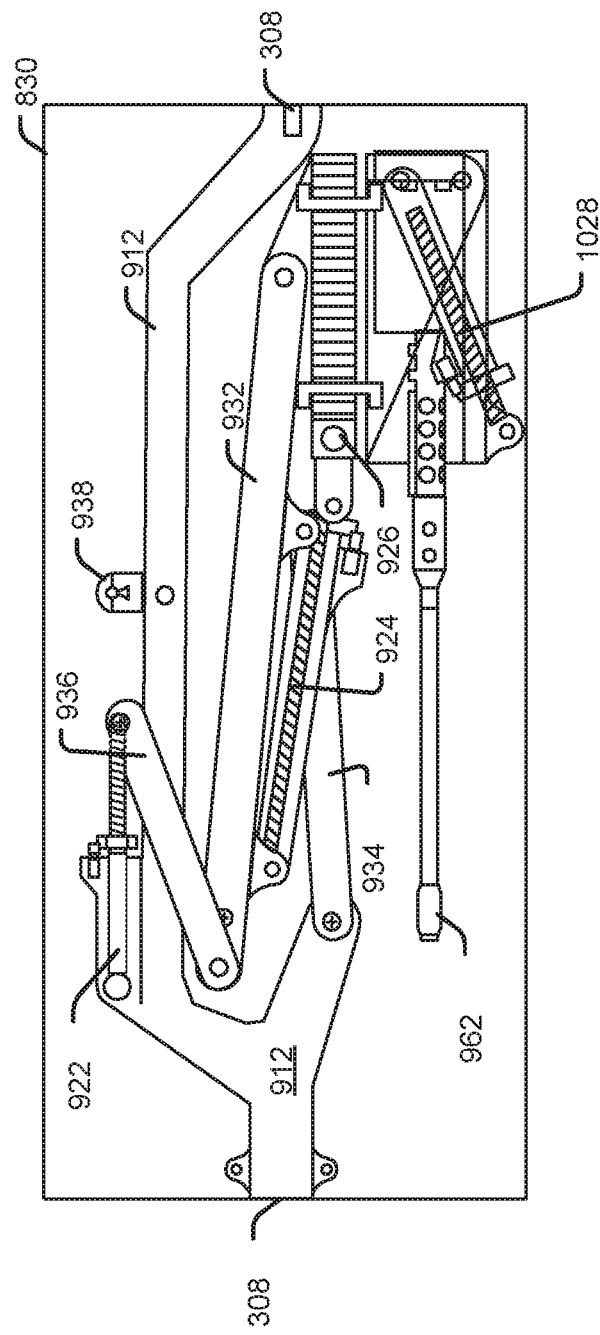
FIG. 10 is a diagram that illustrates a side view of the second particular example of the weapons system in a retracted state.

FIG. 10 is a diagram that illustrates a particular example of a side view 1000 of the weapons system 802 in a retracted state. FIG. 10 depicts the weapons system 802 in an internal bay (e.g., the internal bay 830 of the aircraft 800 of FIG. 8) prior to deployment. The weapons system 802 may be communicatively coupled to a control system, as described with reference to FIG. 1. As illustrated in FIG. 10, the first actuator 922 is extended, the second actuator 924 is retracted and the linkages 932, 934, 936 are in the first linkage position. The gun mount 914 is retracted within the internal bay 830 of the aircraft 800, and an elevation actuator 1028 of the gun mount 914 is retracted. The one or more weapons 962 are oriented in the first (e.g., stowage) orientation parallel to the roll axis 270.

Figure 11:
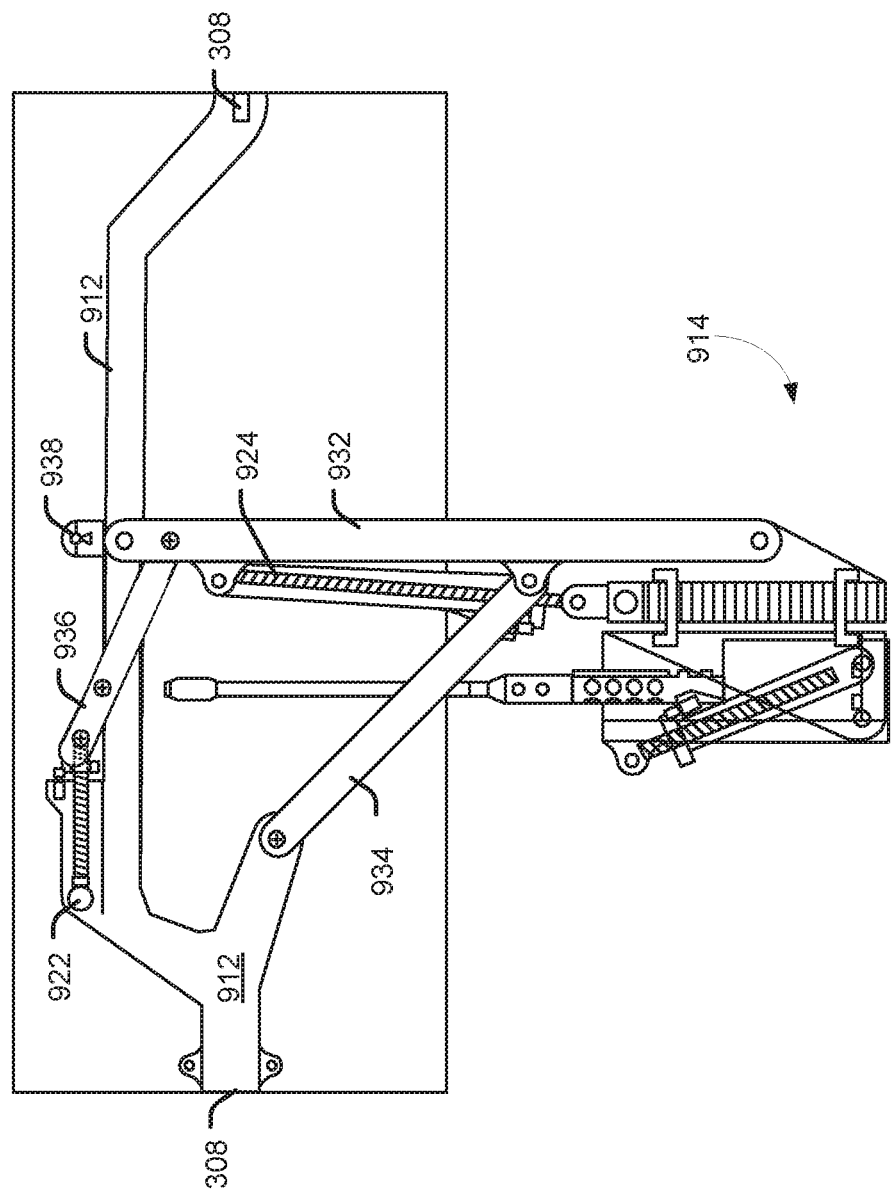
FIG. 11 is a diagram that illustrates a side view of the second particular example of the weapons system in a partially extended state.

FIG. 11 is a diagram that illustrates a particular example of a side view 1100 of the weapons system 802 in a partially extended (or retracted) state. The partially extended state may correspond to the second position. The partially extended state may correspond to a state where the gun mount 914 has been extended (e.g., rotated or lowered)

beneath the aircraft 800, and where the gun mount 914 is oriented parallel to a yaw axis (e.g., vertically oriented) of the aircraft 800. As illustrated in FIG. 11, the gun mount 914 has not yet begun to rotate (e.g., an elevation angle of the gun mount 914 is the same as in FIG. 9) into the active or engagement position.

FIG. 11 depicts the weapons system 802 after the first actuator 922 has been activated (e.g., a jackscrew of the first actuator 922 is retracted). Retraction of the first actuator 922 rotates the gun mount 914 with respect to the aircraft 800. For example, the first actuator 922 moves the gun mount 914 from the first position to the second position. To illustrate, the retraction of the jackscrew of the first actuator 922 moves the main linkage 932, the drag brace linkage 934, and the shortening linkage 936 from the first linkage position to the second linkage position. The retraction of the jackscrew of the first actuator 922 moves the main linkage 932 in contact with the uplock 938 (e.g., the uplock linkage). The uplock 938 may control or lock the main linkage 932 in the second linkage position (e.g., the main linkage 932 is oriented parallel to a yaw axis of the aircraft 800).

Figure 12:
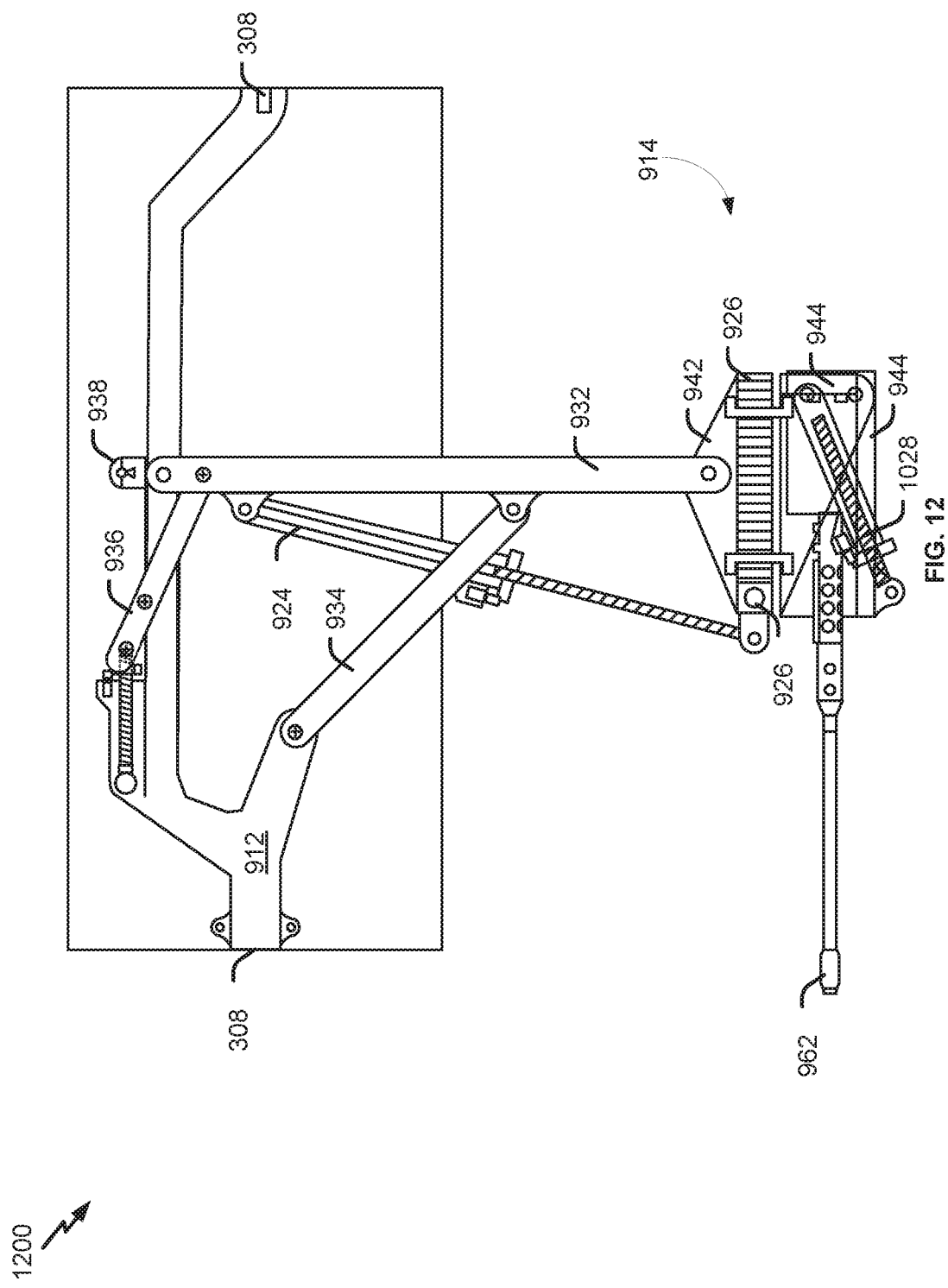
FIG. 12 is a diagram that illustrates a side view of the second particular example of the weapons system in an extended state.

FIG. 12 is a diagram that illustrates a particular example of a side view 1200 of the weapons system 802 in an extended state. The extended state may correspond to the second position. The extended state may correspond to a state where the gun mount 914 has been lowered beneath the aircraft 800, and where the gun mount 914 is oriented parallel to a roll axis (e.g., longitudinally oriented) of the aircraft 800.

FIG. 12 depicts the weapons system 802 after the second actuator 924 has been activated (e.g., a jackscrew of the second actuator 924 is extended). Extension of the second actuator 924 rotates the gun mount 914 (e.g., the upper turret 942 and the lower turret 944) with respect to the main linkage 932. To illustrate, the second actuator 924 adjusts an elevation angle (e.g., pitch angle) of the gun mount 914 and the one or more weapons 962.

After the gun mount 914 is rotated into the active or engagement position, the gun laying drive 926 may be configured to rotate the one or more weapons 962 from a first orientation to a second orientation. The first orientation of the weapon 962 may have a longitudinal alignment (e.g., parallel to a roll axis of the aircraft) and the second orientation may have a transverse alignment (e.g., parallel to a pitch axis of the aircraft). In some implementations, the gun laying drive 926 may be configured to aim the one or more weapons 962. For example, the gun laying drive 926 may adjust an aiming direction (e.g., a yaw angle or heading) of the one or more weapons 962 in response to user input or based on automated targeting or tracking. To illustrate, the gun laying drive 926 may rotate the lower turret 944 about a yaw axis of the aircraft 800. The gun laying drive 926 may not rotate the upper turret 942. The gun laying drive 926 may include or correspond to a worm gear actuator.

Additionally, the elevation actuator 1028 may be configured to rotate or aim the one or more weapons 962. Extension of the elevation actuator 1028 rotates the lower turret 944 of the gun mount 914 with respect to the upper turret 942 of the gun mount 914. The elevation actuator 1028 may adjust the aiming direction by adjusting an elevation angle of the gun mount 914, the one or more weapons, or both. To illustrate, as the elevation actuator 1028 extends, the lower turret 944 is rotated away (e.g., downwards) from the upper turret 942 and the aircraft 800 increasing the elevation angle. The elevation actuator 1028 may adjust the elevation angle in response to user input or based on automated targeting or tracking.

Figure 13:
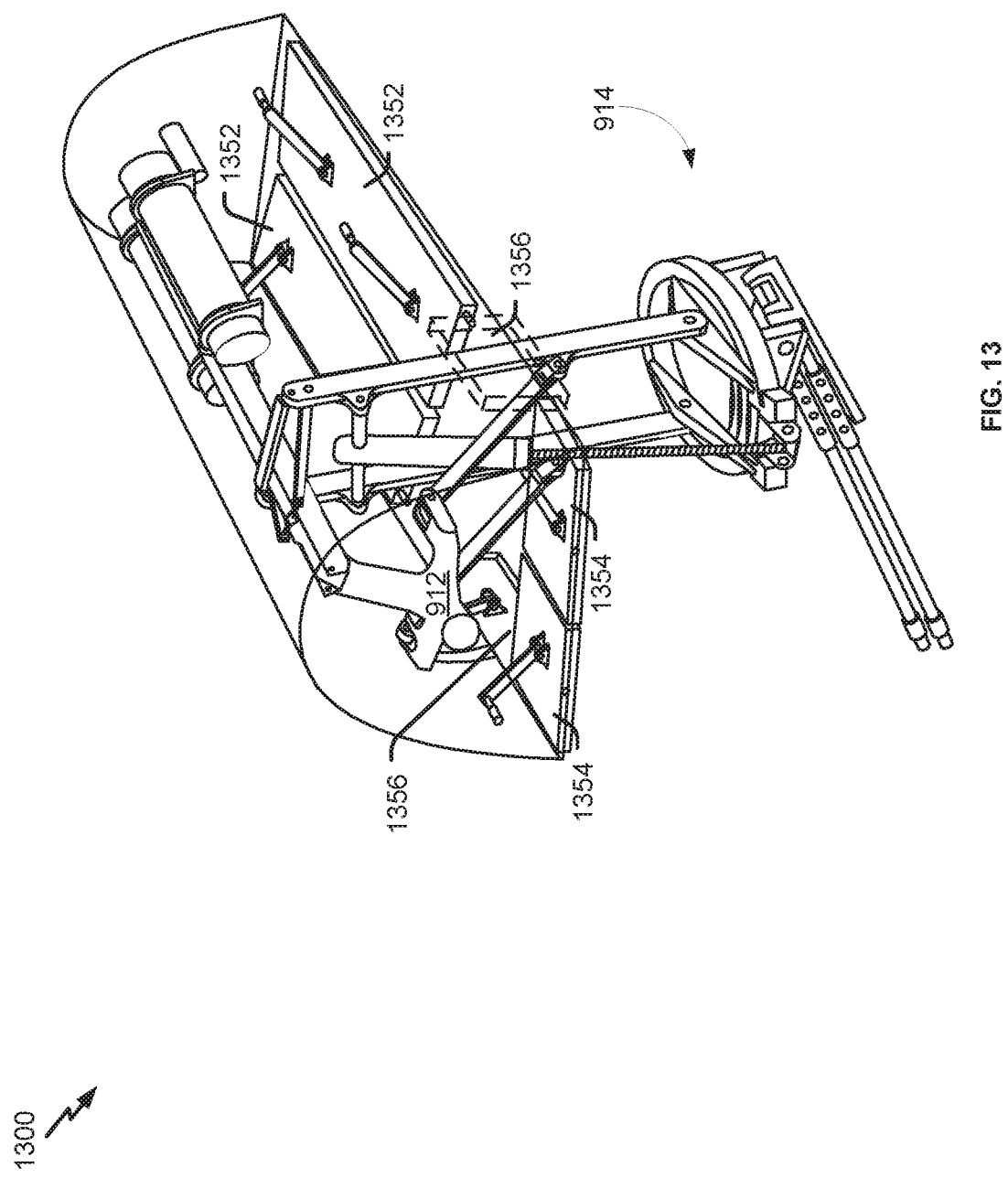
FIG. 13 is a diagram that illustrates an isometric view of the second particular example of the weapons system including sealing doors.

FIG. 13 is a diagram that illustrates a particular example of an isometric view 1300 that illustrates doors of the weapons system 802. The aircraft 800 may include one or more weapons bay doors, access hatches, sealing doors, or a combination thereof. FIG. 13 illustrates one particular configuration of the doors of an internal bay (e.g., the internal bays 810, 820, 830) of the aircraft 800. As illustrated in FIG. 13, the internal bay 830 of the aircraft 800 includes sealing doors 1352, access hatches 1354, and bay doors 1356. In FIG. 13, a port side bay door of the bay doors 1356 is depicted in dashed lines for clarity.

The sealing doors 1352 are configured to open and close to allow the weapons system 802 to deploy. The sealing doors 1352 may be configured to close to seal a portion of the internal bay 830 while the gun mount 914 is in the second position (e.g., deployed). To illustrate, the sealing doors 1352 may direct airflow away from entering into the internal bay 830 (e.g., prevent the airflow into a portion of the internal bay 830) when closed, while the gun mount 914 is in the second position.

The access hatches 1354 are configured to open and close to allow access to the internal bay 830 of the aircraft 800. The access hatches 1354 may include or correspond to the access hatch 250 of FIGS. 2 and 7. Additionally or alternatively, the access hatches 1354 may operate as sealing doors. For example, when the second actuator 924 is activated, a barrel of the one or more weapons 962 may not clear the access hatches 1354 during extension or retraction, and thus the access hatches 1354 may be opened to enable the extension and retraction of the gun mount 914. The bay doors 1356 are configured to open and close to allow the weapons system 802 to deploy and to operate. The bay doors 1356 may be open (e.g., may not close) while the gun mount 914 is in the second position.

Prior to flying the aircraft 800, the access hatches 1354 may be opened to load ammunition containers 364. The access hatches 1354 may be closed and the aircraft 800 may takeoff. During operation of the aircraft 800, the sealing doors 1352 and the bay doors 1356 may be opened prior to deployment of the gun mount 914. After the gun mount 914 is deployed, the sealing doors 1352 may be closed. The aircraft 800 may provide close-air-support (e.g., operate the one or more weapons 962) with the gun mount 914 extended through an opening created by the bay doors 1356 being open. After providing the close-air-support, the sealing doors 1352 may be opened (e.g., re-opened) and the gun mount 914 may be retracted to the first position internal to the internal bay 830. The sealing doors 1352 and the bay doors 1356 may be closed after the gun mount 914 is retracted. Additionally, as illustrated in FIG. 13, the access hatches 1354 may function as sealing doors to accommodate the size of the one or more weapons 962. To illustrate, the access hatches 1354 may be opened prior to deployment (e.g., extension of the second actuator 924) of the gun mount 914, closed after the gun mount 914 is deployed, and opened (re-opened) before the gun mount 914 is retracted (e.g., retraction of the second actuator 924).

In some implementations, the aircraft 800 may include one or more moldings, fairings, or cowlings (not shown) upstream of the internal bay 830 in the airflow configured to divert the airflow from entering the internal bay 830 when the sealing doors 1352, the bay doors 1356, or both, are open. By using moldings, fairings, cowlings, sealing doors, or a combination thereof, the aircraft 800 may have reduced drag when the bay doors 1356 are open as compared to an aircraft without one or more components to divert the airflow from entering the internal bay 830 when the bay doors 1356 are open. Additionally, by using compound movements (e.g., movement in multiple directions), sealing doors, or a combination thereof, the weapons system 802 may deploy a weapon that is larger (e.g., longer) than a dimension of the bay doors 1336. Thus, the weapons system 802 may be installed or retrofit into smaller spaces, smaller aircraft, or both, and may have reduced drag as compared to weapons systems with simple movement (e.g., movement in one direction) and without sealing doors.

Figure 14:
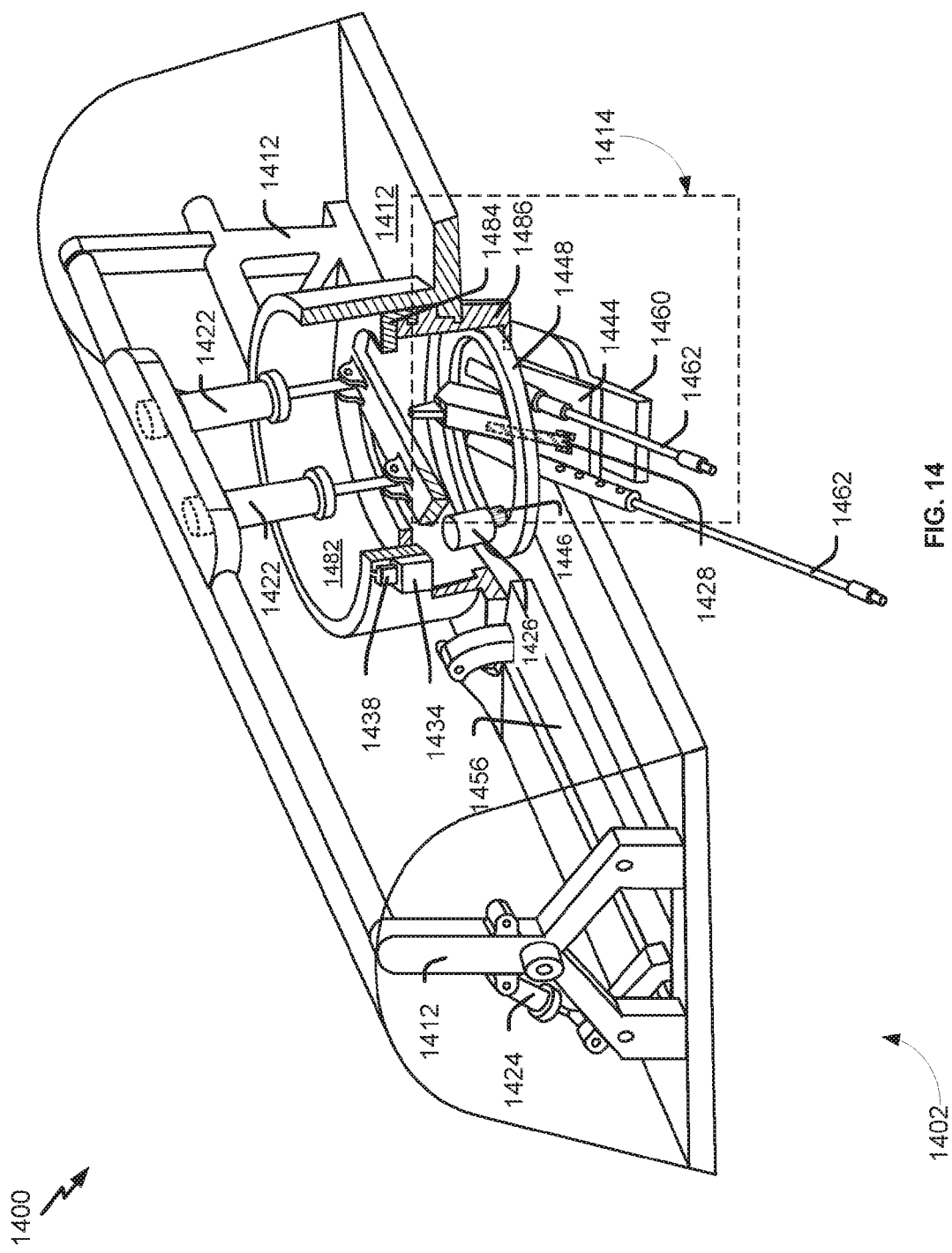
FIG. 14 is a diagram that illustrates an isometric view of a third example of the weapons system in an extended state.

FIG. 14 is a diagram that illustrates a particular example of an isometric view 1400 of a weapons system 1402. The weapons system 1402 may be installed (e.g., retrofitted) in an internal bay of an aircraft, such as one or more of the internal bays 210, 220, 230 of the aircraft 200 of FIG. 2 or the internal bays 810, 820, 830 of the aircraft 800 of FIG. 8. In FIG. 14, port side components (e.g., a port side bay door, a forward port side door hinge, and a port side door actuator) of the weapons system 1402 and the aircraft have been omitted for clarity. In some implementations, bay doors (e.g., originally designed bay doors) of the aircraft 800 may be removed prior to installation of the weapons system 1402. In a particular implementation, the weapons system 1402 may include integrated bay doors (e.g., replacement bay doors) and bay door actuators.

The weapons system 1402 includes an adaptor 1412 configured to couple to an internal structure 308 of the aircraft. As illustrated in FIG. 14, the adaptor 1412 is coupled to forward and aft internal structures. The adaptor 1412 is coupled to a gun mount 1414 via a deployment system. The adaptor 1412 may be configured to be coupled to the bay doors of the aircraft. As illustrated in FIG. 14, the adaptor 1412 includes an integrated starboard bay door 1456 via a hinge, as further described with reference to FIG. 15. In such implementations, the adaptor 1412 may include or may be coupled to door actuators, such as a starboard door actuator 1424. The adaptor 1412 may include or correspond to a frame or one or more supports of the weapons system 1402. The adaptor 1412 may include or correspond to the adaptor 112 and the deployment system may include or correspond to the deployment system 116 of FIG. 1. The adaptor 1412 is further described with reference to FIG. 15.

The weapons system 1402 further includes three circular support structures 1482, 1484, 1486, such as cylinders, drums, or rings. A first support structure 1482 (e.g., an outer ring) is part of the adaptor 1412 or coupled (e.g., fixedly coupled) to the adaptor 1412. The first support structure 1482 may be configured to absorb operational loads, such as loads caused by recoil and drag. The first support structure 1482 may not be configured to extend, retract, or rotate with respect to the adaptor 1412. In some implementations, the first support structure 1482 may include a cut-out to enable storage of the one or more weapons 1462 (or a barrel thereof).

A second support structure 1484 (e.g., a middle ring) is configured to extend and retract a third support structure 1486 (e.g., an inner ring). The second support structure 1484 may be coupled to the adaptor 1412 via the one or more actuators 1422. The second support structure 1484 may not be configured to rotate. In a particular implementation, the one or more actuators 1422 include a jack screw.

The third support structure 1486 (e.g., the inner ring) may be configured to rotate within the first support structure 1482, the second support structure 1484, or both. The third support structure 1486 (e.g., an upper turret) is coupled to a lower turret 1444 via an elevation actuator 1428. In a particular implementation, the elevation actuator 1428 includes a jack screw.

Additionally or alternatively, the elevation actuator 1428 may be configured to aim the one or more weapons 1462. For example, the elevation actuator 1428 may adjust an elevation angle of the gun mount 1414, the one or more weapons 1462, or both. To illustrate, as the elevation actuator 1428 extends, the lower turret 1444 is rotated away (e.g., downwards) from the third support structure 1486 (e.g., the upper turret) and the aircraft increasing the elevation angle. The elevation actuator 1428 may adjust the elevation angle in response to user input or based on automated targeting or tracking.

One or more actuators 1422 may be coupled to the adaptor 1412 and the gun mount 1414 and may be configured to move the gun mount 1414 between a first position and a second position. The one or more actuators 1422 may move the second support structure 1484 and the third support structure 1486 to partially extend the lower turret 1444 of the gun mount 1414 beneath the aircraft.

The gun mount 1414 includes a gun laying drive 1426 and the elevation actuator 1428. The gun laying drive 1426 is configured to rotate the third support structure 1486 and the gun mount 1414. In a particular implementation, the gun laying drive 1426 includes to a rack and pinion type actuator. In such implementations, the gun laying drive 1426 may include a motor, a pinion 1446, and a gear 1448. The motor and the pinion 1446 may be located in the cut-out section of the first support structure 1482. The pinion 1446 may be configured to be mechanically coupled (e.g., mesh and rotate) with the gear 1448 (e.g., an annular spur gear) of the third support structure 1486 to control rotation of the gun mount 1414 (e.g., the lower turret 1444 of the gun mount 1414). In other implementations, the gun laying drive 1426 may be external to the third support structure 1486 (as shown in FIGS. 15-16).

The gun mount 1414 may be configured to couple to the one or more weapons 1462. The one or more weapons 1462 may include two or more different types of weapons. As illustrated in FIG. 14, the weapons system 1402 includes different types of autocannons (e.g., a M230 and a GAU-23/A).

During operation, the gun laying drive 1426 may be configured to rotate the one or more weapons 1462 from a first position to a second position. The first position of the weapon 1462 may have a longitudinal orientation or alignment (e.g., parallel to a roll axis of the aircraft) and the second position may have a transverse orientation or alignment (e.g., parallel to a pitch axis of the aircraft). In some implementations, the gun laying drive 1426 may be configured to aim the one or more weapons 1462. For example, the gun laying drive 1426 may adjust an aiming direction of the one or more weapons 1462 in response to user input or based on automated targeting or tracking.

Figure 15:
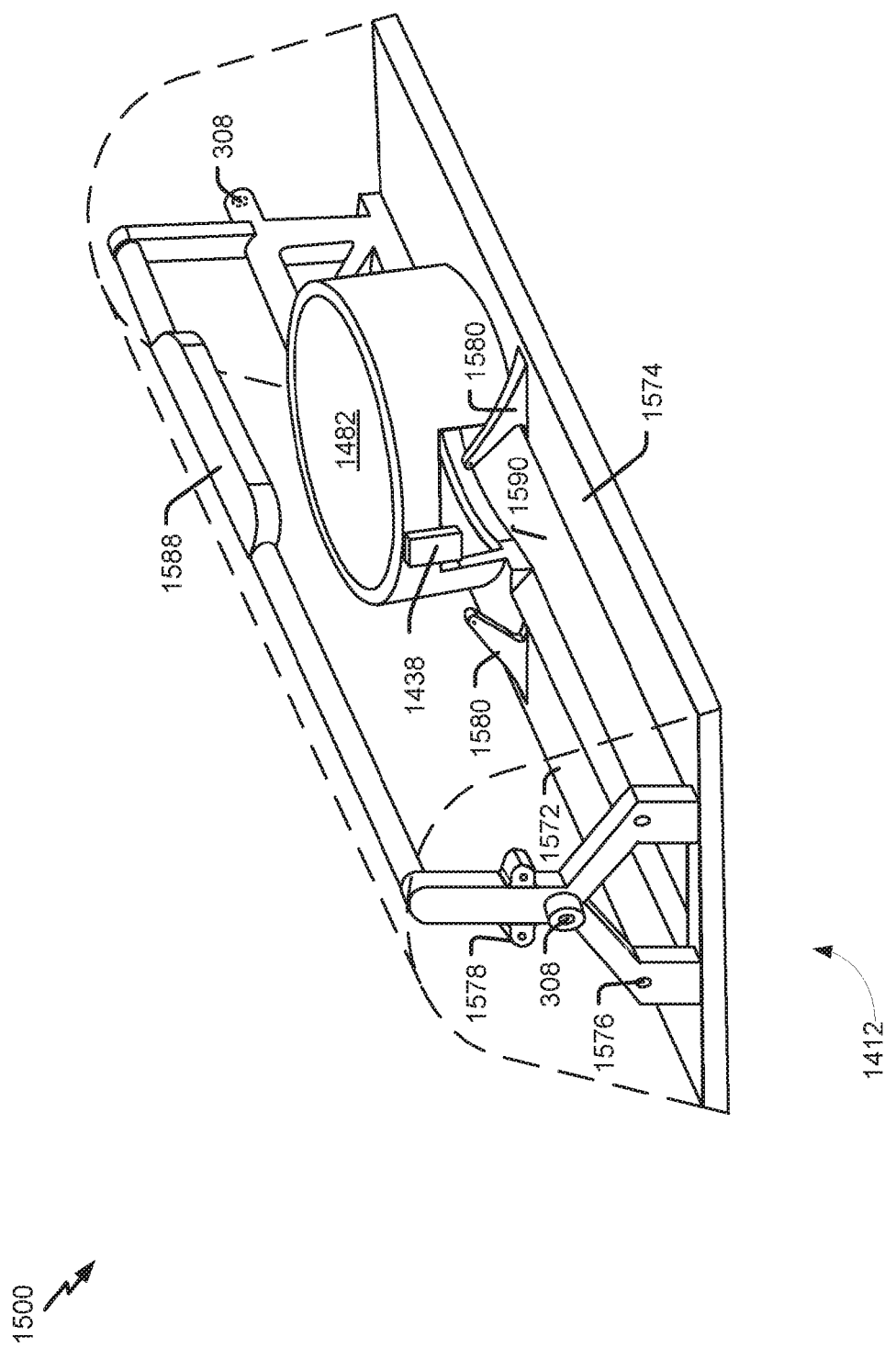
FIG. 15 is a diagram that illustrates an isometric view of an adaptor of the third example of the weapons system.
Figure 16:
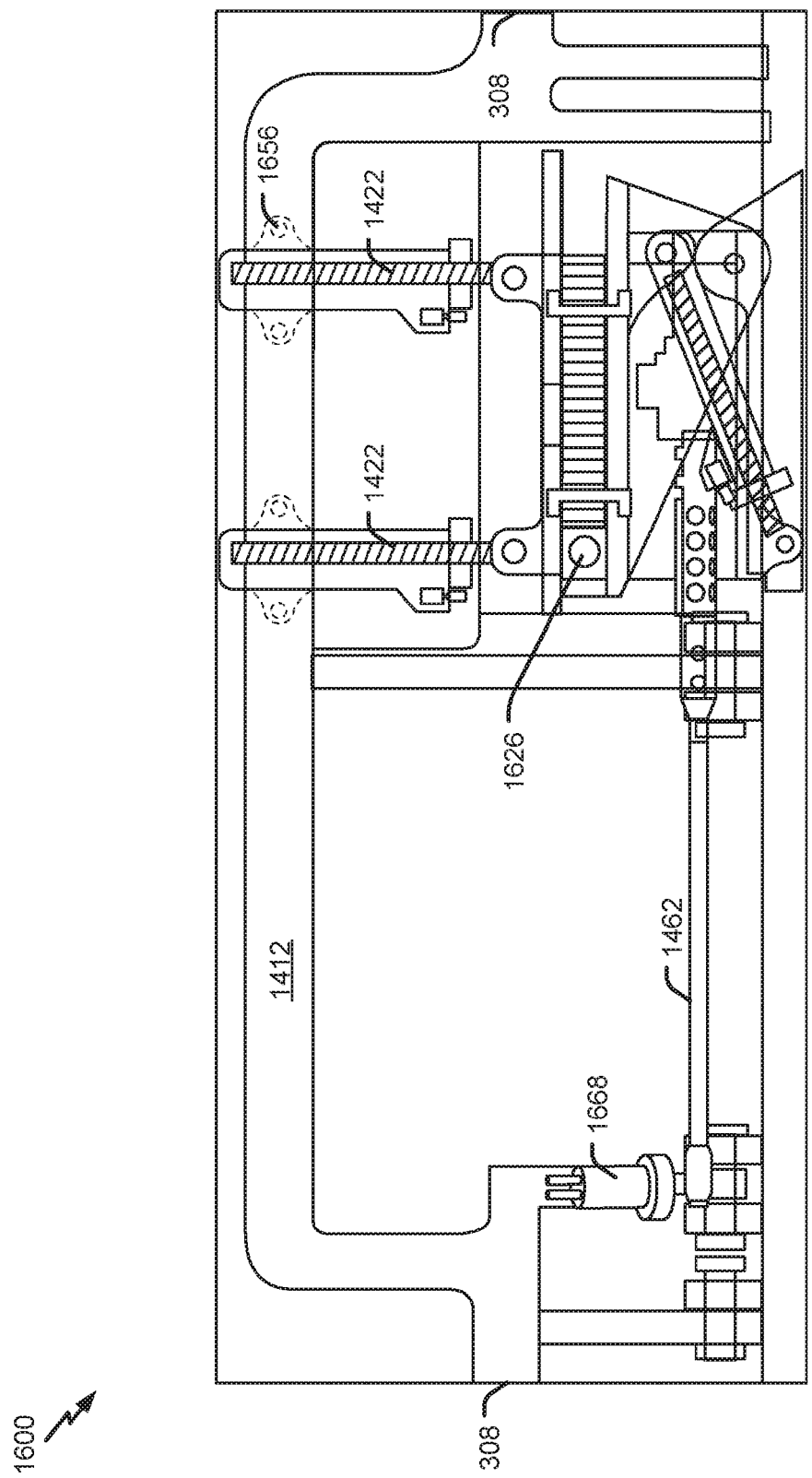
FIG. 16 is a diagram that illustrates a side view of the third particular example of the weapons system in a retracted state.

FIG. 15 is a diagram that illustrates a particular example of an isometric view 1500 of the adaptor 1412 of the weapons system 1402. In FIG. 15, bay doors and components thereof (e.g., forward door hinges, door actuators, a port side door, and a port side door actuator) have been omitted for clarity.

The adaptor 1412 includes one or more hinges configured to couple to door actuators. As illustrated in FIG. 15, the adaptor 1412 includes a pair (e.g., a starboard and a port) of forward door hinges 1576 and a pair of door actuator hinges 1578. The door actuators (e.g., the starboard door actuator 1424 of FIG. 14) are configured to open and close the bay doors. Additionally, the adaptor 1412 may include one or more hinges configured to couple to door hinges. As illustrated in FIG. 15, the adaptor 1412 includes a pair (e.g., a starboard and a port) of aft door hinges 1580.

The adaptor 1412 further includes the first support structure 1482 and an actuator housing 1588. The first support structure 1482 may be coupled to the internal structure 308 via the starboard side portion 1572, the port side portion 1574, and one or more other members. The first support structure 1482 may include the cut-out portion, the gun laying drive slider 1434 and the gun laying drive rail 1438. The first support structure 1482, the starboard side portion 1572, and the port side portion 1574 define an opening 1590. The opening 1590 is sealed from airflow over the aircraft by the internal bay doors or the sealing doors of the aircraft. The actuator housing 1588 may be configured to couple the one or more actuators 1422 to the adaptor 1412. The actuator connection may be positioned or located above the first support structure 1482.

Figure 17:
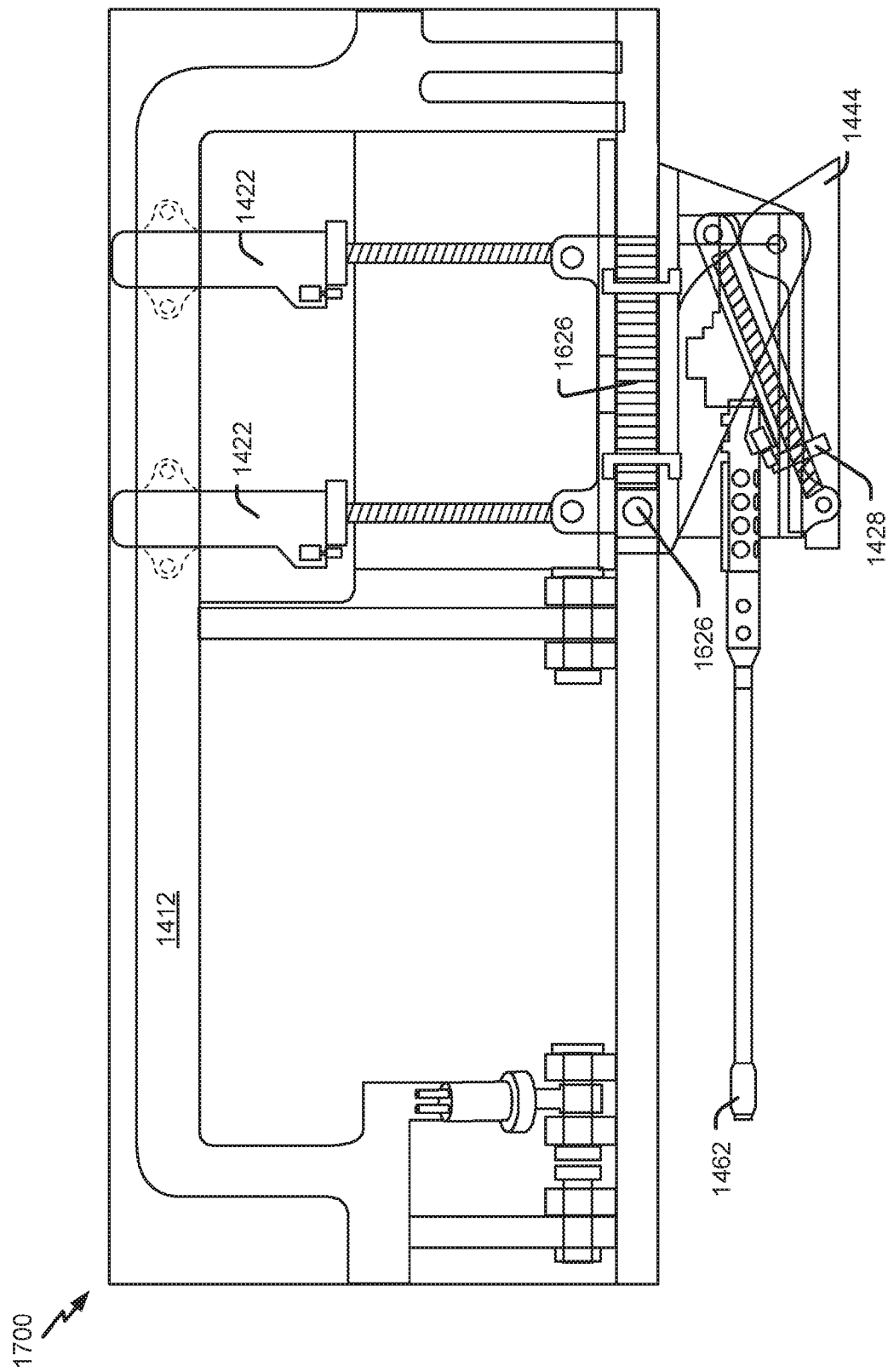
FIG. 17 is a diagram that illustrates a side view of the third particular example of the weapons system in an extended state.

FIG. 16 is a diagram that illustrates a particular example of a side view 1600 of the weapons system 1402 in a retracted state. FIG. 16 depicts the weapons system 1402 in an internal bay (e.g., the internal bay 830 of the aircraft 800 of FIG. 8) before deployment. In FIG. 16, some components of the weapons system 1402 are not shown for clarity. Additionally, FIGS. 16 and 17 illustrate an alternative implementation of the weapons system 1402 that includes a gun laying drive 1626. The gun laying drive 1626 is external to the third support structure 1486 and may be configured to rotate the third support structure 1486 and the lower turret 1444. The gun laying drive 1626 may include or correspond to the gun laying drive 926.

The weapons system 1402 may be communicatively coupled to a control system, as described with reference to FIG. 1. As illustrated in FIG. 16, the one or more actuators 1422 are in a retracted state, and the gun mount 914 is retracted within the internal bay 830 of the aircraft 800. The one or more actuators 1422 are attached to the adaptor 1412 via brackets 1656. The one or more weapons 1462 are oriented in the first (e.g., stowage) orientation parallel to the roll axis 270. In some implementations, the weapons system 1402 may include actuators 1668. The actuators 1668 (e.g., integrated bay door actuators) may be configured to open and close bay doors, such as the integrated starboard bay door 1456 of FIG. 14.

FIG. 17 is a diagram that illustrates a particular example of a side view 1700 of the weapons system 802 in an extended state. The extended state may correspond to the second position. The extended state may correspond to a state where the gun mount 1414 has been lowered beneath the aircraft 800 and is oriented parallel to a roll axis of the aircraft 800.

FIG. 17 depicts the weapons system 1402 after the one or more actuators 1422 have been activated (e.g., a jackscrew of the one or more actuators 1422 is extended). Extension of the one or more actuators 1422 extends (e.g., lowers) the gun mount 1414 (e.g., the third support structure 1486 and the lower turret 1444) from the first position to the second position. After the one or more actuators 1422 have been extended, the gun laying drive 1626 and the elevation actuator 1428 may rotate or aim the lower turret 1444 and the one or more weapons 1462, as described with reference to FIG. 9. Alternatively, the weapons system 1402 may include the gun laying drive 1426 (e.g., the motor, the pinion 1446, and the gear 1448) and the gun laying drive 1426 may rotate or aim the lower turret 1444 and the one or more weapons 1462, as described with reference to FIG. 14.

During operation of the aircraft 800, the bay doors may be opened prior to deployment of the gun mount 1414. After the gun mount 1414 is deployed, the bay doors may be closed. The aircraft 800 may provide close-air-support (e.g., operate the one or more weapons 1462) with the gun mount 1414 extended through an opening created by the bay doors being open. After providing the close-air-support, the bay doors may be opened (e.g., re-opened) and the gun mount 1414 may be retracted to the first position internal to the internal bay 830. The bay doors may be closed after the gun mount 1414 is retracted.

Figure 18:
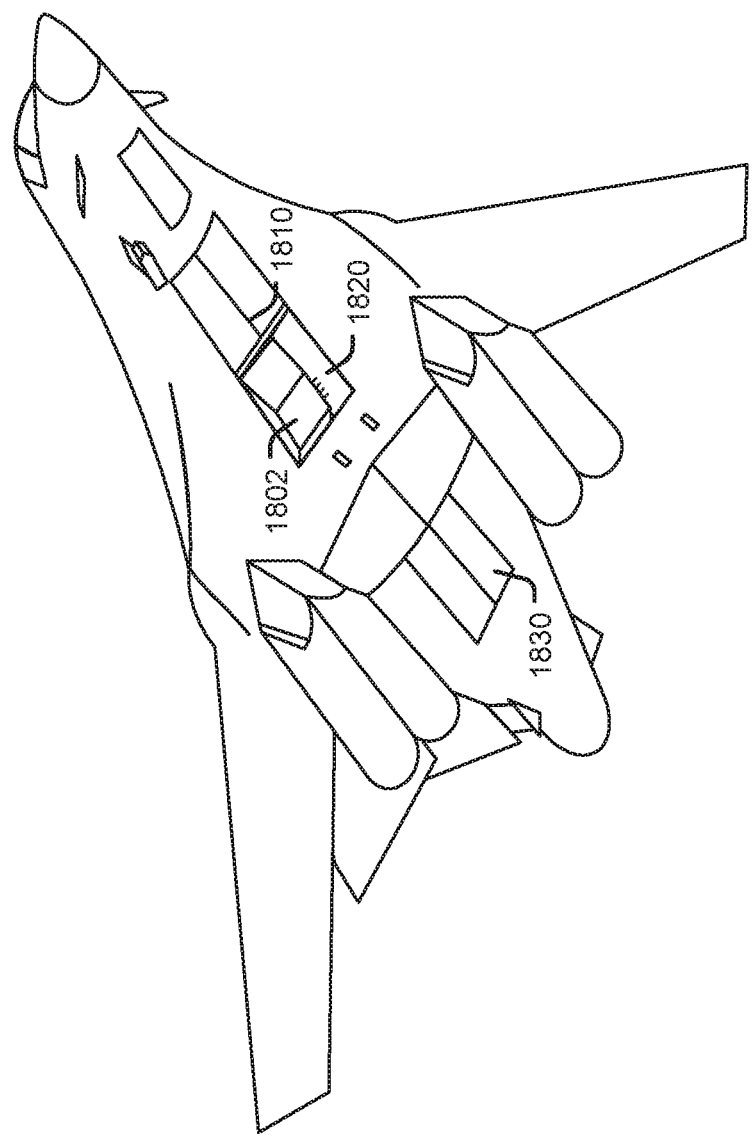
FIG. 18 is a diagram that illustrates a fourth particular example of a weapons system coupled to an aircraft.
Figure 19:
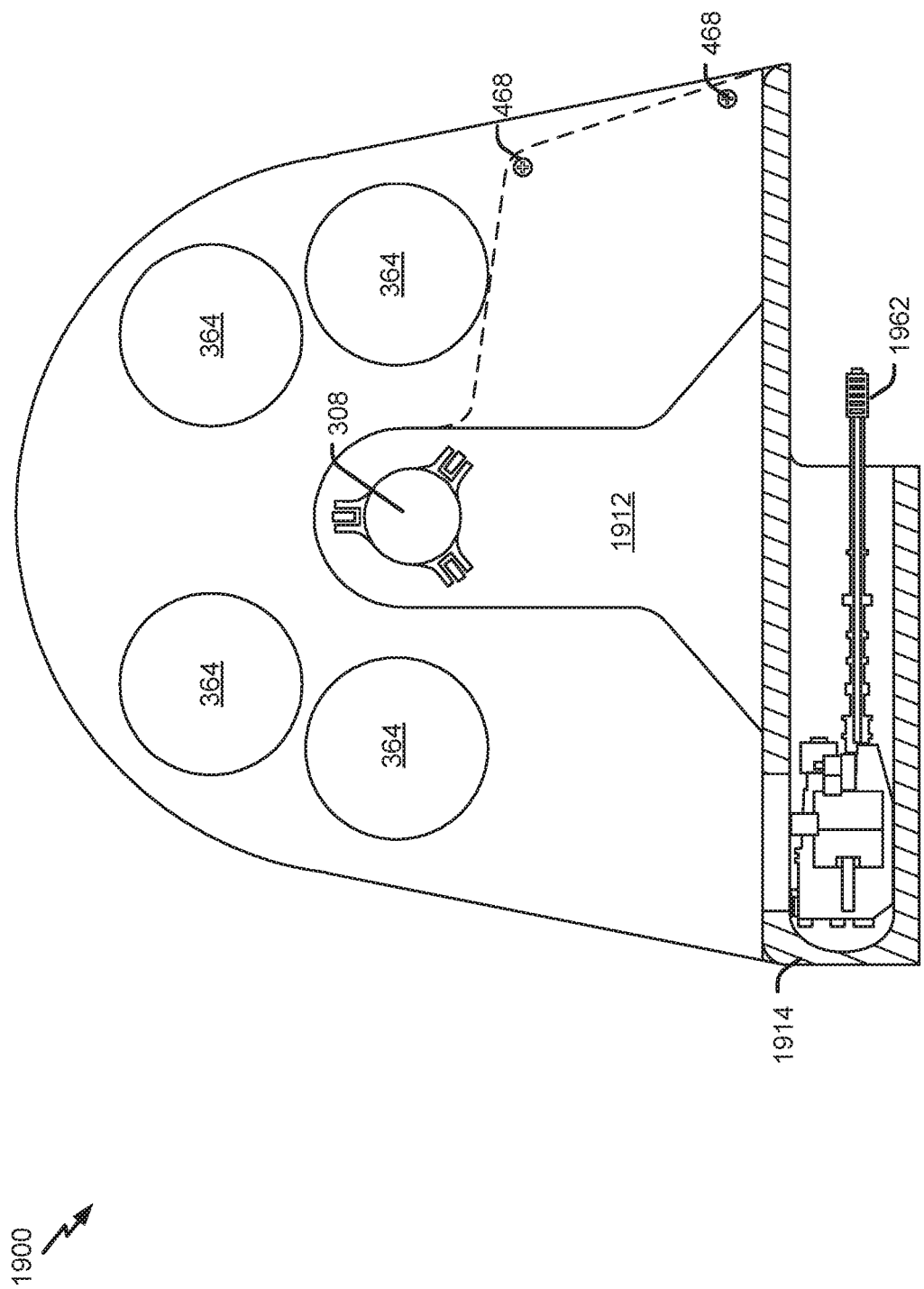
FIG. 19 is a diagram that illustrates a front view of the fourth particular example of the weapons system.
Figure 20:
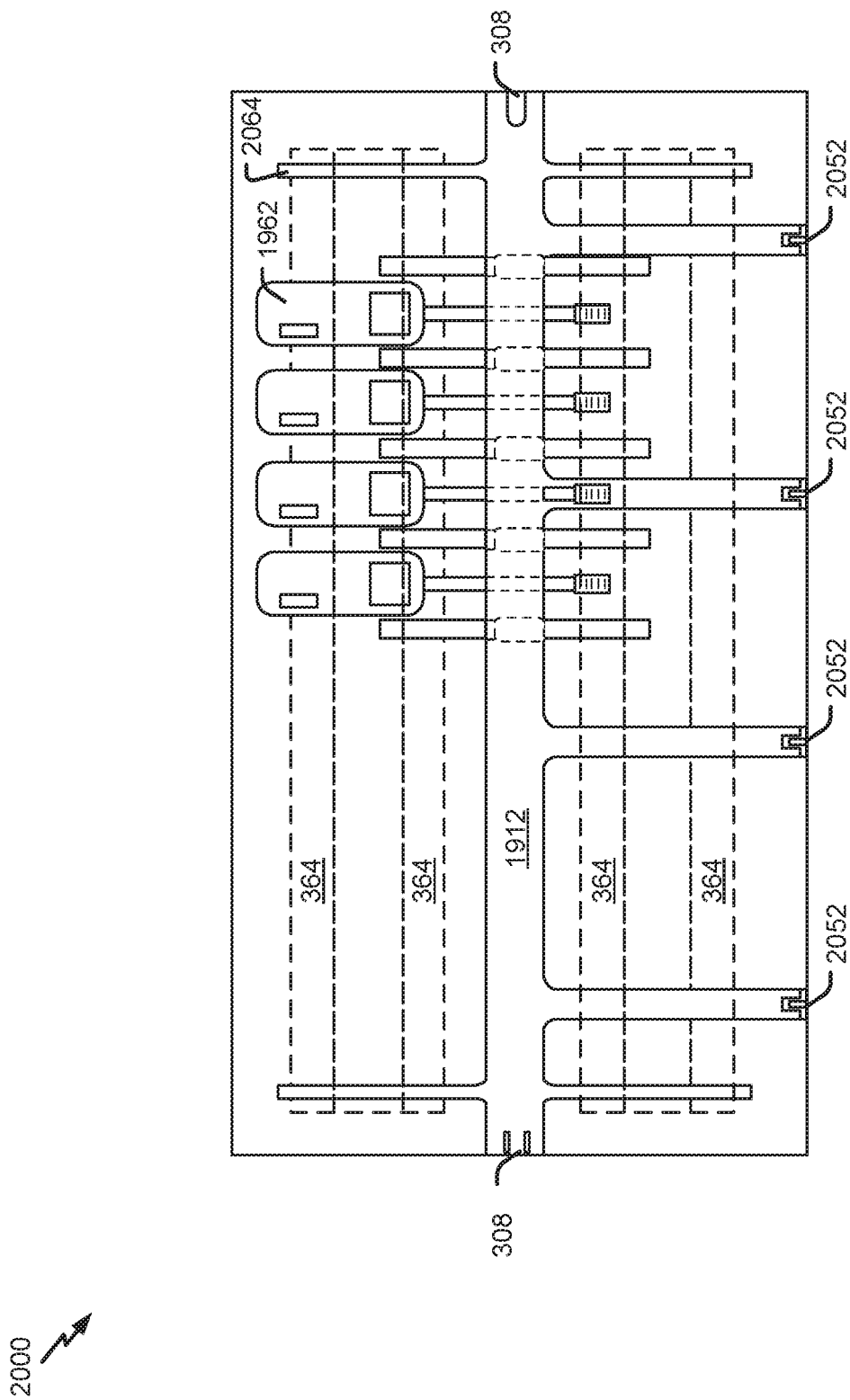
FIG. 20 is a diagram that illustrates a top view of the fourth particular example of the weapons system.

FIG. 18 is a diagram that illustrates a particular example of an aircraft 1800 that includes a weapons system 1802. The aircraft 1800 may include one or more internal bays, such as internal bays 1810, 1820, and 1830. The weapons system 1802 may be installed (e.g., retrofitted) in one or more of the internal bays 1810 or 1820 of the aircraft 1800. As illustrated in FIG. 18, the weapons system 1802 is located in a second internal bay 1820. The weapons system 1802 is described in greater detail in FIGS. 19 and 20. FIGS. 18-20 are directed to a fixed (e.g., non-retractable or extendable) weapons system, as opposed to the deployable weapons systems of FIGS. 2-17.

FIG. 19 is a diagram that illustrates a particular example of a front view 1900 of the weapons system 1802. The weapons system 1802 include an adaptor 1912 configured to couple to the internal structure 308. In some implementations, the adaptor 1912 may be configured to couple to the door lugs 468 in addition to the internal structure 308. An illustrative configuration of the adaptor 1912 for such implementations is illustrated by dashed lines in FIG. 19. The adaptor 1912 is coupled (e.g., fixedly coupled) to a gun mount 1914.

The gun mount 1914 may extend outside (e.g., below) the fuselage of the aircraft 1800. The gun mount 1914 may be fixed in position at least partially external to the aircraft 1800. The gun mount 1914 may be configured to couple to one or more weapons 1962. The one or more weapons 1962 may be fixed or movable (e.g., aimable). To illustrate, the weapons system 1802 may include a gun laying drive and linkage (not shown) configured to adjust an aiming direction of the one or more weapons 1962 with respect to the gun mount 1914 and the aircraft 1800. Barrels of the one or more weapons 1962 may protrude through an opening of the gun mount 1914. The one or more weapons 1962 may be mounted transversally to the aircraft 1800 (e.g., parallel to a pitch axis of the aircraft 1800).

The weapons system 1802 may include ammunition containers 364 coupled to the adaptor 1912. For example, the ammunition containers 364 (e.g., ammunition drums, a magnetic power source, a laser generating power source, etc.) may be coupled to a support of a frame of the adaptor 1912 or coupled to the frame by brackets, as illustrative, non-limiting examples. In other implementations, the ammunition containers 364 may be coupled to structures or supports of the internal bay 1810. The ammunition containers 364 may be operatively coupled to the one or more weapons 1962. For example, the ammunition containers may provide (e.g., feed) ammunition to the one or more weapons 1962.

In other implementations, a sealing door may be added to close the opening (e.g., the vertical opening) of the gun mount 1914. The internal bay 1810 of the aircraft 1800 may or may not be sealed from the gun mount 1914. For example, the aircraft 1800 and the weapons system 1802 may not include any openings between the gun mount 1914 and the internal weapons bay. To illustrate, air external to the aircraft 1800 may not be able to enter the internal bay 1810 from the opening of the gun mount 1914.

Although the ammunition containers 364 are illustrated as being mounted longitudinally (e.g., parallel to a roll axis of the aircraft) and as being mounted perpendicular to the one or more weapons 1962, the ammunition containers 364 may be mounted parallel to the one or more weapons. For example, a particular ammunition container may be positioned over a corresponding weapon of the one or more weapons 1962.

FIG. 20 is a diagram that illustrates a particular example of a top view 2000 of the weapons system 1802. The top view 2000 illustrates the adaptor 1912, the ammunition containers 364, and the one or more weapons 1962 of the weapons system 1802.

The adaptor 1912 may be configured to couple to door attachments 2052. The door attachments 2052 may include attachments used to couple the bay doors to the aircraft. The adaptor 1912 may be configured to couple to one or more of the door attachments 2052. In a particular implementation, the adaptor 1912 may be configured to couple to the door attachments 2052 via door lugs, such as the door lugs 468 of FIGS. 4 and 19. The door attachments 2052 may include or correspond to the door hinges 752 of FIG. 7. The adaptor 1912 may include one or more ammunition support members 2064 configured to couple to and to support the ammunition containers 364.

Although the one or more weapons 1962 are illustrated as being fixed to the gun mount 1914, in other implementations the weapons system 1802 may include a gun laying drive configured to move or aim the one or more weapons 1962. The gun laying drive may include or correspond to the gun laying drive 326 of FIG. 3. The gun laying drive (not shown) may be connected to a gun laying linkage (not shown), such as the gun laying linkage 342 of FIG. 3, and the gun laying linkage may be coupled to each of the one or more weapons 1962 via a pin or screw.

Although each of the weapons of the one or more weapons 1962 are illustrated in FIG. 20 as being the same type of weapons, in other implementations the weapons system 1402 may include different types of weapons. For example, the weapons system 1802 may include a machine gun and a rail gun. As another example, the weapons system 1802 may include two different types of autocannons.

An aircraft that includes a fixed weapons system coupled to an internal structure of the aircraft located in a weapons bay may have increased performance as compared to an aircraft that includes a weapons system with barrels protruding from a side of the fuselage. To illustrate, a barrel of a fixed weapons system coupled to an internal structure of the aircraft located in a weapons bay may be recessed or may not extend as far away from the aircraft as compared to side mounted fixed weapons systems. Thus, drag produced by the aircraft may be decreased and performance of the aircraft may be increased as compared to an aircraft that includes side mounted fixed weapons systems.

Figure 21:
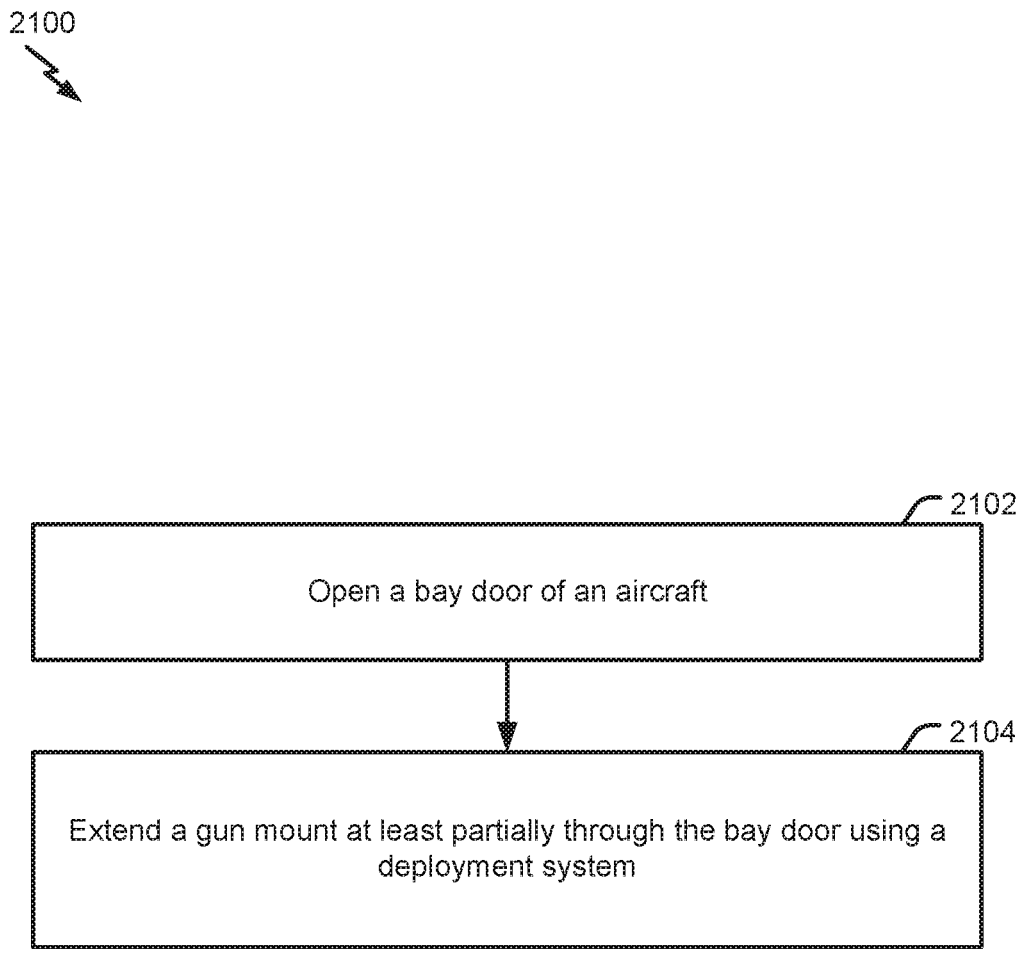
FIG. 21 is a flow chart of an example of a method of using a weapons system.

FIG. 21 illustrates a particular example of a method 2100. The method 2100 may include or correspond to a method of operating an aircraft based weapons system. The method 2100 may be performed by the system 100 of FIG. 1, the aircraft 200, the weapons system 202 of FIG. 2, the aircraft 800, the weapons system 802 of FIG. 8, the weapons system 1402 of FIG. 14, or a combination thereof.

The method 2100 includes, at 2102, opening a bay door of an aircraft. For example, the bay door may include of correspond to the access hatches 250 of FIG. 2 or FIG. 7, the sealing doors 1352, the access hatches 1354, the bay doors 1356 of FIG. 13, the integrated starboard bay door 1456 of FIG. 14, or a combination thereof.

The method 2100 includes, at 2104, extending a gun mount at least partially through the bay door using a deployment system coupled via an adaptor to an internal structure of the aircraft. For example, the gun mount may include or correspond to the gun mount 114 of FIG. 1, the gun mount 314 of FIG. 3, the gun mount 914 of FIG. 9, or the gun mount 1414 of FIG. 14. The deployment system may include or correspond to the deployment system 116 of FIG. 1, the deployment system of FIGS. 3-7, the deployment system of FIGS. 9-13, or the deployment system of FIGS. 14-17. The adaptor may include or correspond to the adaptor 112 of FIG. 1, the adaptor 312 of FIG. 3, the adaptor 912 of FIG. 9, or the adaptor 1412 of FIG. 14. The internal structure may include or correspond to the internal structure 308 of FIG. 3.

To illustrate, referring to FIG. 1, the deployment system 116 may receive a signal from the control system 104 to activate the one or more actuators 122. Activation of the one more actuators 122 may move the one or more linkages 132 to move the gun mount 114 from the first position internal to the aircraft to the second position at least partially external to the aircraft. Other illustrative implementations are described with reference to FIGS. 2-7, FIGS. 8-13, and FIGS. 14-17.

In some implementations, the method 2100 may include flying the aircraft at a supersonic speed with the gun mount at least partially external to the aircraft. To illustrate, referring to FIGS. 14-17, the aircraft 800 may fly at speeds greater than the speed of sound (e.g., Mach 1) with the gun mount 1414 in the second position at least partially external to the aircraft 800. The opening 1590 created by the various components of the adaptor 1412 enables the gun mount 1414 to be in the second position when the bay doors are closed. As described with reference to FIGS. 14-17, the aircraft 800 may include one or more molding, fairings, or cowlings configured to direct the air flow away from entering the internal bay 830.

In some implementations, the method 2100 may include retracting the gun mount using the deployment system. The method 2100 may also include closing the bay door of the aircraft. To illustrate, referring to FIG. 1, the control system 104 may transmit signals to retract the gun mount 114 and to the bay doors of the aircraft. The bay doors may be closed before or after the gun mount 114 is moved from the second position to the first position.

In some implementations, the method 2100 may include adjusting an aiming direction of the weapon relative to a yaw axis of the aircraft, relative to a pitch of axis of the aircraft, or both. To illustrate, the gun laying drive and the gun laying linkage may adjust the aiming direction of the one or more weapons with respect to the yaw axis 290 of the aircraft 200 of FIG. 2. In a particular implementation, the gun laying linkage may also adjust the aiming direction relative to the pitch axis of the aircraft, such as the pitch axis 280 of the aircraft 200 of FIG. 2. As another illustration, the elevation actuator may adjust the aiming direction of the one or more weapons with respect to the pitch axis of the aircraft.

In a particular illustrative implementation of operating an aircraft based weapons system, an aircraft receives a request for close-air-support. The aircraft flies at supersonic speeds (e.g., at a speed greater than a speed of sound) to a location of the request. The aircraft slows to an engagement speed (e.g., a subsonic speed) and opens a weapons bay door of the aircraft. A gun mount is extended at least partially through the weapons bay door using a deployment system coupled via an adaptor to an internal structure of the aircraft. The aircraft provides close-air-support and then retracts the gun mount. The aircraft weapons bay door is then closed and the aircraft may resume supersonic flight.

Figure 22:
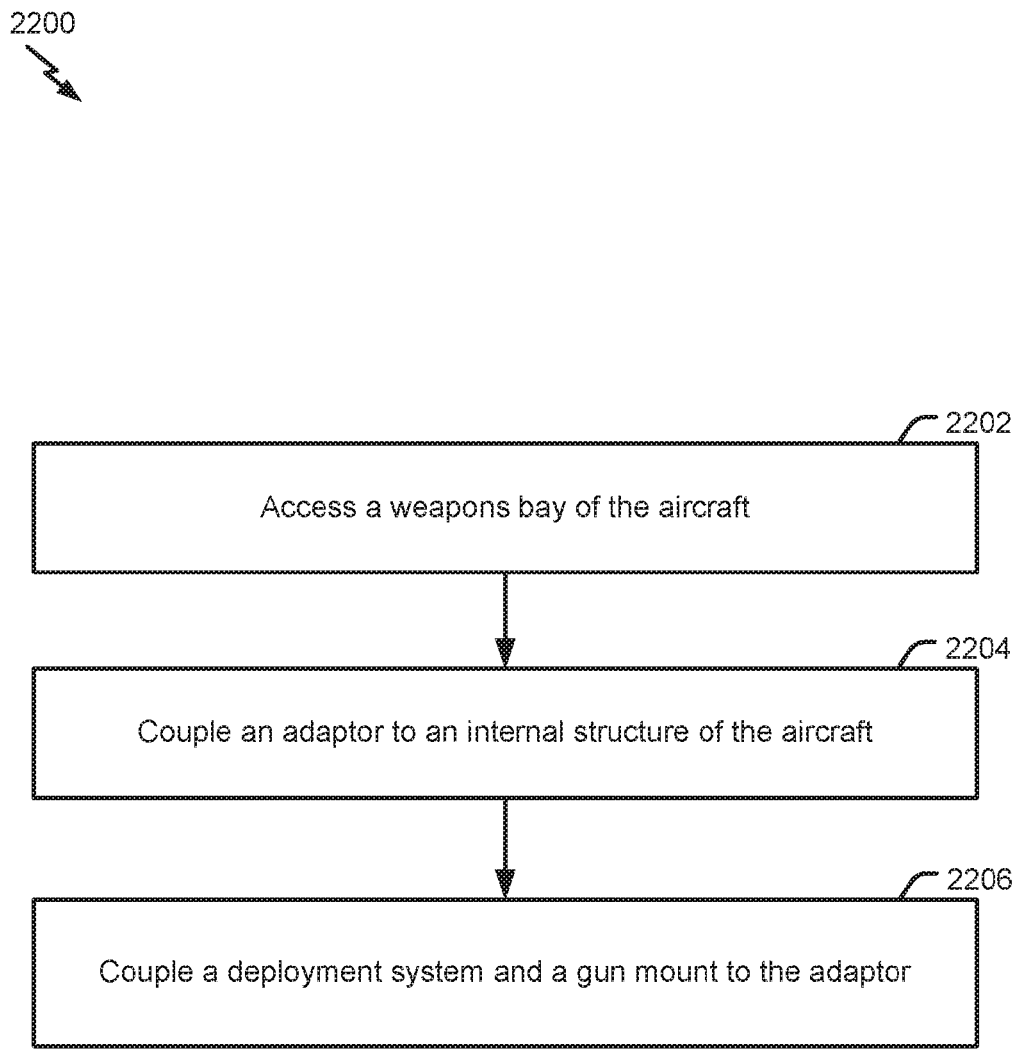
FIG. 22 is a flow chart of another example of a method of installing weapons system.

FIG. 22 illustrates a particular example of a method 2200. The method 2200 may include or correspond to a method of installing a weapons system on an aircraft. The method 2200 may install or retrofit the system 100 of FIG. 1, the weapons system 202 of FIG. 2, the weapons system 802 of FIG. 8, the weapons system 1402 of FIG. 14, the weapons system 1802 of FIG. 18, or a combination thereof, on an aircraft. The method 2200 may be performed on the aircraft 200 of FIG. 2, the aircraft 800 of FIG. 8, or a combination thereof.

The method 2200 includes, at 2202, accessing a weapons bay of the aircraft. For example, the weapons bay may include or correspond to the internal bays 210, 220, 230 of FIG. 2, the internal bays 810, 820, 830 of FIG. 8, or the internal bays 1810, 1820, 1830 of FIG. 18. In some implementations, the weapons bay is accessed by opening or removing a bay door. For example, the bay door may include or correspond to doors of the internal bays 210, 220, 230 of FIG. 2, the internal bays 810, 820, 830 of FIG. 8, or the internal bays 1810, 1820, 1830 of FIG. 18. In a particular implementation, the bay door is a bomb bay door.

The method 2200 includes, at 2204, coupling an adaptor to an internal structure of the aircraft. For example, the adaptor may include or correspond to the adaptor 112 of FIG. 1, the adaptor 312 of FIG. 3, the adaptor 912 of FIG. 9, the adaptor 1412 of FIG. 14, or the adaptor 1912 of FIG. 19. The internal structure may include or correspond to the internal structure 308 of FIG. 3. In some implementations, the internal structure is located within the weapons bay. In a particular implementation, the internal structure includes one or more supports for a rotary launcher.

The method 2200 includes, at 2206, coupling a deployment system and a gun mount to the adaptor. The deployment system is configured to move the gun mount from a first position internal to the aircraft to a second position at least partially external to the aircraft. The deployment system may include or correspond to the deployment system 116 of FIG. 1, the deployment system of FIGS. 3-7, the deployment system of FIGS. 9-13, or the deployment system of FIGS. 14-17. The gun mount may include or correspond to the gun mount 114 of FIG. 1, the gun mount 314 of FIG. 3, the gun mount 914 of FIG. 9, the gun mount 1414 of FIG. 14, or the gun mount 1914 of FIG. 19.

In some implementations, the method 2200 may include, after removing the bay door, installing a second bay door. The bay door may have a first length that is greater than a second length of the second bay door. For example, the bay door may include or correspond to doors of the internal bays 210, 220, 230 of FIG. 2, the internal bays 810, 820, 830 of FIG. 8, or the internal bays 1810, 1820, 1830 of FIG. 18 and the second bay door may include or correspond to the access hatch 250 of FIGS. 2 and 7, the sealing doors 1352, the access hatches 1354, the bay doors 1356 of FIG. 13, the starboard bay door 1456, or a combination thereof. A length of the bay door may include or correspond to a length (e.g., a longitudinal length) of the bay door parallel to the roll axis of the aircraft.

In some implementations, the method 2200 may include coupling ammunition containers to a support member that is coupled to the adaptor. For example, the ammunition containers may include or correspond to the ammunition containers 364 of FIG. 3. To illustrate, the ammunition containers 364 may be coupled to the adaptor 312 via a bracket or a fastener or a support member, such as the ammunition support members 2064.

In some implementations, the method 2200 may include coupling one or more of the adaptor, the gun mount, the deployment system, or a weapon coupled to the gun mount, to a control system of the aircraft. To illustrate, referring to FIG. 1, the one or more actuators 122 of the deployment system 116 and the gun mount 114 may be communicatively coupled to the control system 104.

In some implementations, the method 2200 may include, before coupling the adaptor to the one or more supports for the rotary launcher, removing the rotary launcher. Additionally, the method 2200 may also include attaching brackets to the one or more supports for the rotary launcher.

In some implementations, the method 2200 may include coupling one or more moldings, fairings, or cowlings to the aircraft. The one or more moldings, fairings, or cowlings may be configured to compensate for changes to air flow over the aircraft. In some implementations, the method 2200 may include reinforcing the weapons bay doors with one or more support members.

Figure 23:
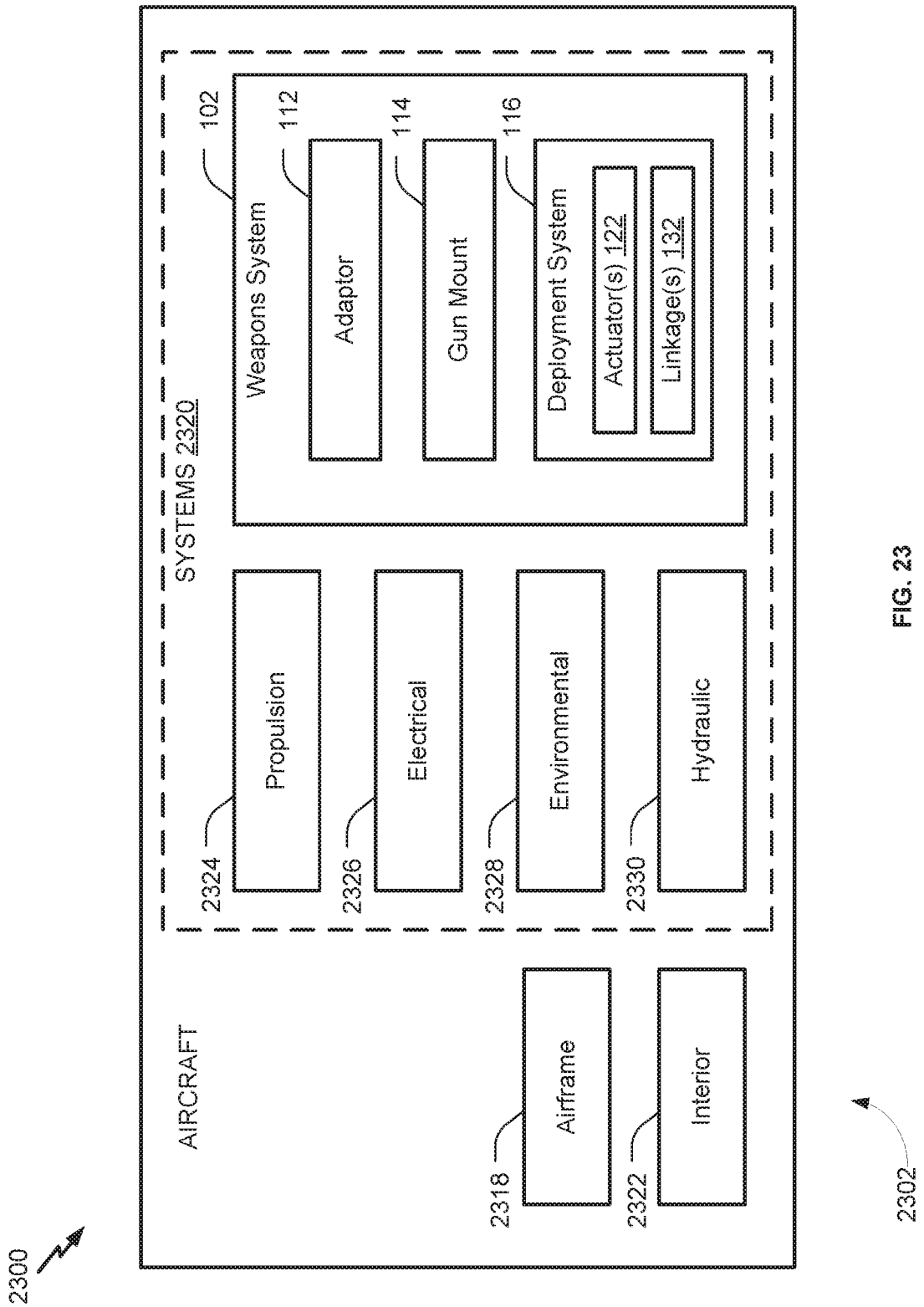
FIG. 23 is a block diagram of an illustrative implementation of an aircraft including a weapons system.

Referring to FIG. 23, a block diagram of an illustrative implementation of an aircraft 2302 that includes the weapons system 102 is shown and designated 2300. The aircraft 2302 may include or correspond to the aircraft 200 of FIG. 2, or the aircraft 800 of FIG. 8, the aircraft 1800 of FIG. 18. The aircraft 2302 may be manned or unmanned (e.g., a drone or an unmanned aerial vehicle (UAV). The aircraft 2302 may include an internal bay to house the weapons system 102.

As shown in FIG. 23, the aircraft 2302 may include an airframe 2318, an interior 2322, and a plurality of systems 2320. The plurality of systems 2320 may include one or more of a propulsion system 2324, an electrical system 2326, an environmental system 2328, or a hydraulic system 2330. The weapons system 102 may include the adaptor 112, the gun mount 114, and the deployment system 116. The deployment system 116 may include the one or more actuators 122 and the one more linkages 132. The weapons system 102 may be communicatively coupled to a control system of the aircraft 2302, such as the control system 104 of FIG. 1. The control system 104 may be configured to execute computer-executable instructions (e.g., a program of one or more instructions) stored in a memory. The instructions, when executed, cause the control system, to perform one or more operations of the method 2100 of FIG. 21.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for mounting a deployable weapon system to an aircraft, the device comprising:
    an adaptor coupled to a linkage system and to an internal structure of the aircraft;
    a gun mount pivotably connected to the linkage system; and
    a deployment system coupled to the adaptor and to the gun mount and configured to move the gun mount from a first position internal to the aircraft to a second position at least partially external to the aircraft, the deployment system comprising pivotable actuators positioned between the gun mount and the adaptor and operable to move the gun mount in multiple planes.

2. The device of claim 1, wherein the adaptor is configured to couple to a support for a rotary launcher located within a weapons bay of the aircraft.

3. The device of claim 1, further comprising a turret coupled to the gun mount, the turret configured to rotate a weapon coupled to the gun mount relative to the aircraft.

4. The device of claim 3, wherein the turret is further configured to adjust an elevation of the weapon relative to the aircraft.

5. The device of claim 1, wherein the deployment system comprises one or more linkages of the linkage system, and further comprising a control system to initiate movement of the gun mount from the first position to the second position.

6. The device of claim 1, wherein the deployment system is configured to move the gun mount from the first position to the second position by movement in one direction.

7. The device of claim 1, wherein the deployment system is configured to move gun mount from the first position to the second position by movement in multiple directions.

8. The device of claim 1, further comprising ammunition containers coupled to a support member that is coupled to the adaptor.

9. The device of claim 1, wherein the first position corresponds to a storage position, wherein a weapon coupled to the gun mount is aligned with a roll axis of the aircraft when stored at the first position.

10. The device of claim 1, wherein the first position corresponds to a storage position, wherein a weapon coupled to the gun mount is aligned with a pitch axis of the aircraft when stored at the first position.

11. The device of claim 1, wherein the adaptor, the gun mount, and the deployment system are included in the aircraft.

12. A method of operating an aircraft based weapons system, the method comprising:
    opening a bay door of an aircraft;
    using a deployment system to at least partially extend a gun mount through the bay door, the gun mount pivotably connected to an internal structure of the aircraft via an adaptor and a linkage system; and
    after extending the gun mount, moving the gun mount in multiple planes using pivotable actuators of the deployment system, the pivotable actuators positioned between the gun mount and the adaptor.

13. The method of claim 12, further comprising flying the aircraft at a supersonic speed with the gun mount at least partially external to the aircraft.

14. The method of claim 12, further comprising:
    retracting the gun mount using the deployment system; and
    closing the bay door of the aircraft.

15. The method of claim 12, wherein moving the gun mount in multiple planes includes adjusting an aiming direction of a weapon relative to a yaw axis of the aircraft, a pitch of axis of the aircraft, or both.

16. A method of installing a weapons system on an aircraft, the method comprising:
    accessing a weapons bay of the aircraft by opening or removing a bay door;
    coupling a linkage system to an internal structure of the aircraft via an adaptor, the internal structure located in the weapons bay; and
    coupling a deployment system and a gun mount to the adaptor via the linkage system such that the gun mount pivotably connected to the linkage system, wherein the deployment system is configured to move the gun mount from a first position internal to the aircraft to a second position at least partially external to the aircraft, and wherein the deployment system comprising pivotable actuators positioned between the gun mount and the adaptor and operable to move the gun mount in multiple planes.

17. The method of claim 16, further comprising, after removing the bay door, installing a second bay door, wherein the bay door has a first length that is greater than a second length of the second bay door.

18. The method of claim 16, further comprising coupling ammunition containers to a support member that is coupled to the adaptor.

19. The method of claim 16, further comprising coupling one or more of the adaptor, the gun mount, the deployment system, or a weapon coupled to the gun mount, to a control system of the aircraft.

20. The method of claim 16, wherein the bay door comprises a bomb bay door, wherein the internal structure includes one or more supports for a rotary launcher, and further comprising, before coupling the adaptor to the one or more supports for the rotary launcher, removing the rotary launcher.

* * * * *